US012027102B2

(12) United States Patent
Park

(10) Patent No.: US 12,027,102 B2
(45) Date of Patent: Jul. 2, 2024

(54) DISPLAY DEVICE AND DISPLAY DRIVING METHOD

(71) Applicant: LG Display Co., Ltd., Seoul (KR)

(72) Inventor: Jeonghyo Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/201,437

(22) Filed: May 24, 2023

(65) Prior Publication Data

US 2023/0386390 A1 Nov. 30, 2023

(30) Foreign Application Priority Data

May 31, 2022 (KR) ........................ 10-2022-0067065

(51) Int. Cl.
*G09G 3/20* (2006.01)
*G09G 3/3258* (2016.01)

(52) U.S. Cl.
CPC ......... *G09G 3/2096* (2013.01); *G09G 3/3258* (2013.01); *G09G 2300/0842* (2013.01); *G09G 2310/0202* (2013.01); *G09G 2310/08* (2013.01); *G09G 2320/0223* (2013.01); *G09G 2320/0233* (2013.01); *G09G 2320/041* (2013.01); *G09G 2330/08* (2013.01); *G09G 2330/12* (2013.01)

(58) Field of Classification Search
None
See application file for complete search history.

(56) References Cited

U.S. PATENT DOCUMENTS

| | | | | |
|---|---|---|---|---|
| 2014/0176516 A1* | 6/2014 | Kim | .................... | G09G 3/3233<br>345/204 |
| 2019/0108792 A1* | 4/2019 | Hwang | ................ | G09G 3/3233 |
| 2022/0199025 A1* | 6/2022 | Hong | .................. | G09G 3/3233 |

* cited by examiner

*Primary Examiner* — Christopher J Kohlman
(74) *Attorney, Agent, or Firm* — Fenwick & West LLP

(57) ABSTRACT

A display device includes a display panel comprising sub-pixels, data lines, and driving transistors, a data driving circuit configured to convert image data into data voltages and apply the data voltages to the data lines, and a timing the controller configured to control the data driving circuit and switch between a first compensation mode and a second compensation mode responsive to a driving frequency variation of the display device during exceeding a reference value, wherein, in the first compensation mode, the data voltages of the driving transistors in an entire area of the display panel are compensated through a real-time sensing process of characteristic values of the driving transistors during a blank period, and in the second compensation mode, the data voltages of the driving transistors in at least a partial area of the display panel are compensated according to a temperature value of the display panel.

25 Claims, 14 Drawing Sheets

DISPLAY DEVICE AND DISPLAY DRIVING METHOD

CROSS REFERENCE TO RELATED APPLICATION

This application claims priority from Republic of Korea Patent Application No. 10-2022-0067065, filed on May 31, 2022, which is hereby incorporated by reference in its entirety.

BACKGROUND

1. Field of Technology

Embodiments of the present disclosure relate to a display device and a display driving method, which are capable of reducing a characteristic value compensation error appearing at a time when a driving frequency changes and improving image quality.

2. Description of the Prior Art

As the information society develops, various demands for display devices which display images are increasing, and various types of display devices such as liquid crystal display and organic light-emitting diode display are being utilized.

Among these display devices, an organic light emitting diode (OLED) display device employs an organic light-emitting diode which emits light by itself (i.e., self-emissive) and thus has advantages in its fast response speed, contrast ratio, emission efficiency, brightness, and viewing angle.

The display device may include a light-emitting element disposed in each of a plurality of subpixels disposed in a display panel and control the light-emitting element to emit light through control of a voltage applied to the light-emitting element, thereby controlling brightness represented by each subpixel and displaying an image.

In this case, the light-emitting element and a driving transistor for controlling the light-emitting element to emit light are disposed in each subpixel defined in the display panel, and according to a driving environment of the display panel, a deviation may occur in characteristic values such as a threshold voltage or mobility of the driving transistor in each subpixel. Thus, a brightness deviation (brightness non-uniformity) between the subpixels may occur, which may degrade image quality.

For example, image data supplied to the display device may be a still image or a moving image which varies at a predetermined speed, and moving images may also correspond to various types of images such as sports images, movies, and game images.

Since a format of the image data may vary according to a type of image data, a variable refresh rate (VRR) mode in which a driving frequency varies according to the type of image data may be used.

However, when the subpixel is driven at various refresh rates by applying the VRR mode, a compensation error for the characteristic values of the driving transistor occurs at a time when the driving frequency changes, causing degradation of image quality.

SUMMARY

Therefore, the inventors of the present specification invented a display device and a display driving method that are capable of reducing a characteristic value compensation error appearing at a time when a driving frequency changes and improving image quality.

An aspect of the present disclosure is to provide a display device and a display driving method that are capable of reducing a characteristic value compensation error and improving image quality by differentiating a compensation mode for characteristic values of a driving transistor according to a driving frequency variation.

Another aspect of the present disclosure is to provide a display device and a display driving method that are capable of reducing a characteristic value compensation error and improving image quality by operating in a first compensation mode for compensating data voltages through a real-time sensing process of characteristic values of driving transistors for an entirety of a display panel when a driving frequency varies to less than a reference value, and operating in a second compensation mode for compensating the data voltages according to a temperature value in some areas when the driving frequency varies to the reference value or more.

Another aspect of the present disclosure is to provide a display device and a display driving method that are capable of reducing a characteristic value compensation error and improving image quality by performing, when a driving frequency varies to a reference value or more, characteristic value compensation on an area smaller than a predetermined value for a brightness deviation through a real-time sensing process and performing the characteristic value compensation on an area greater than the predetermined value for a brightness deviation through a temperature detecting process.

Another aspect of the present disclosure is to provide a display device and a display driving method that are capable of effectively reducing a characteristic value compensation error and improving image quality by maintaining a second compensation mode, in which data voltages are compensated according to a temperature value for at least a portion of an area a reference time when a driving frequency varies to a reference value or more, and when the reference time elapses, switching to a first compensation mode in which the characteristic values are compensated for an entirety of a display panel through areal-time sensing process.

In one embodiment, a display device comprises: a display panel including a plurality of subpixels, a plurality of gate lines, a plurality of data lines, and a plurality of driving transistors each included in a corresponding subpixel from the plurality of subpixels; a data driving circuit configured to convert image data into data voltages and apply the data voltages to the plurality of data lines; and a timing controller configured to control the data driving circuit and switch between a first compensation mode and a second compensation mode responsive to a driving frequency variation of the display device during which the display device switches between different driving frequencies exceeding a reference value, wherein, in the first compensation mode, the data voltages of the plurality of driving transistors in an entire area of the display panel are compensated through a real-time sensing process of characteristic values of the plurality of driving transistors during a blank period of a frame period, the frame period including a display driving period during which the data voltages are applied and the blank period during which the data voltages are maintained, and in the second compensation mode, the data voltages of the plurality of driving transistors in at least a partial area of the display panel are compensated for according to a temperature value of the display panel.

In one embodiment, a display driving method of a display device including a display panel including a plurality of subpixels, a plurality of gate lines, a plurality of data lines, and a plurality of driving transistor transistors each included in a corresponding subpixel from the plurality of subpixels, and a data driving circuit configured to convert image data into data voltages and apply the data voltages to the plurality of data lines, the method comprising: operating in a first compensation mode during which the data voltages applied to the plurality of driving transistors in an entire area of the display panel are compensated for through a real-time sensing process of characteristic values of the plurality of driving transistors during a blank period of a frame period, the frame period including a display driving period during which the data voltages are applied and the blank period during which the data voltages are maintained; calculating a driving frequency variation between a driving frequency of a current frame and a driving frequency of a previous frame that is prior to the current frame; comparing the frequency variation with a reference value; and switching from operating in the first compensation mode to operating in a second compensation mode responsive to the frequency variation being greater than the reference value, wherein, during the second compensation mode, the data voltages applied to the plurality of driving transistors in at least a partial area of the display panel are compensated according to a temperature value of the display panel.

In one embodiment, a display device comprises: a display panel including a plurality of subpixels, a plurality of gate lines, a plurality of data lines, and a plurality of driving transistors each included in a corresponding subpixel from the plurality of subpixels; a data driving circuit configured to convert image data into data voltages and apply the data voltages to the plurality of data lines during a display driving period of a frame period that includes the display driving period and a blank period during which the data voltages are maintained; a timing controller configured to control the data driving circuit and switch operation of the display device from a first compensation mode to a second compensation mode based on the display device switching between a first driving frequency and a second driving frequency; and a sensor on a portion of the display panel, the sensor configured to measure a characteristic of the display panel, wherein during the first compensation mode the data voltages applied to the plurality of driving transistors in an entire area of the display panel are compensated based on sensed characteristics of the plurality of driving transistors during the blank period of the frame period, and during the second compensation mode the data voltages applied to the plurality of driving transistors in at least a portion of the display panel are compensated based on the characteristic of the display panel measured by the sensor.

According to the embodiments of the present disclosure, it is capable of reducing a characteristic value compensation error appearing at a time when a driving frequency changes and improving image quality.

In addition, according to the embodiments of the present disclosure, it is capable of reducing a characteristic value compensation error and improving image quality by differentiating a compensation mode for characteristic values of a driving transistor according to a driving frequency variation.

In addition, according to the embodiments of the present disclosure, it is capable of reducing a characteristic value compensation error and improving image quality by operating in a first compensation mode for compensating characteristic values through a real-time sensing process for an entirety of a display panel when a driving frequency varies to less than a reference value, and operating in a second compensation mode for compensating the characteristic values according to a temperature value in some areas when the driving frequency varies to the reference value or more.

In addition, according to the embodiments of the present disclosure, it is capable of reducing a characteristic value compensation error and improving image quality by performing, when a driving frequency varies to a reference value or more, characteristic value compensation on an area smaller than a predetermined value for a brightness deviation through a real-time sensing process and performing the characteristic value compensation on an area greater than the predetermined value for a brightness deviation through a temperature detecting process.

In addition, according to the embodiments of the present disclosure, it is capable of effectively reducing a characteristic value compensation error and improving image quality by maintaining a second compensation mode, in which characteristic values are compensated according to a temperature value for at least a portion of an area a reference time when a driving frequency varies to a reference value or more, and when the reference time elapses, switching to a first compensation mode in which the characteristic values are compensated for an entirety of a display panel through a real-time sensing process.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
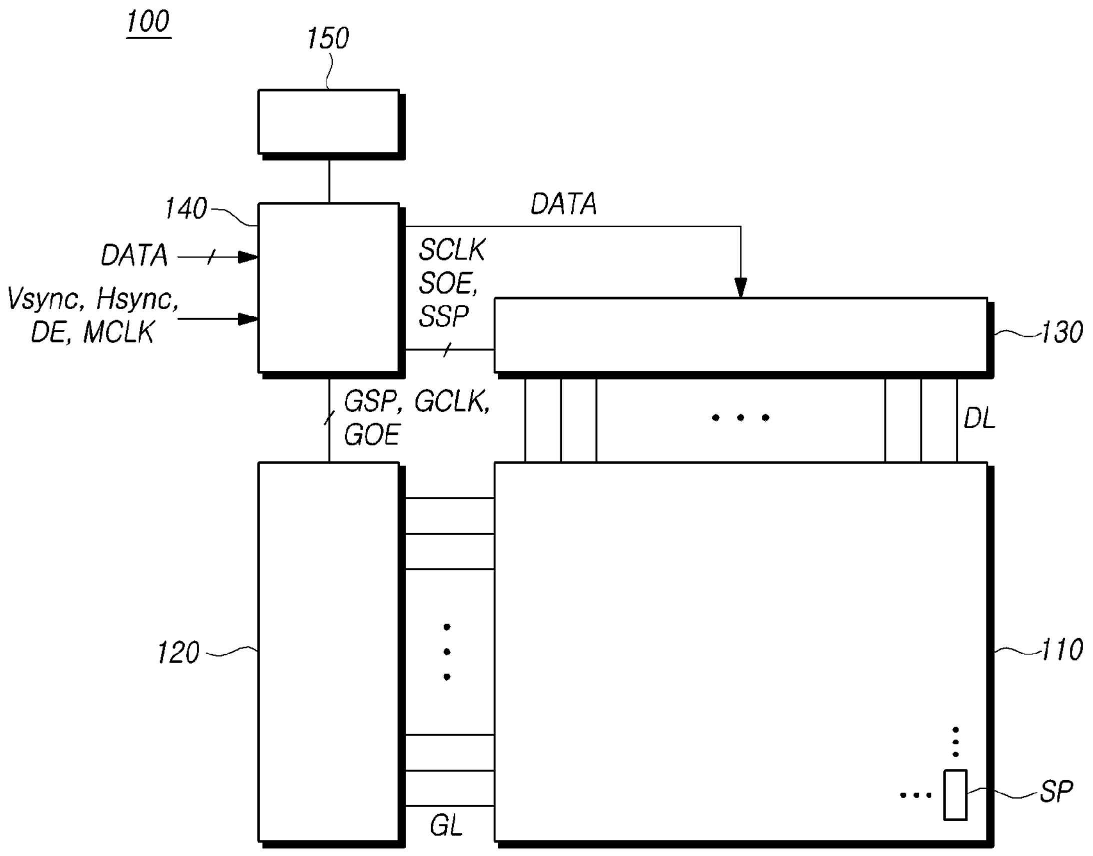
FIG. 1 is a schematic diagram illustrating a configuration of a display device according to embodiments of the present disclosure.

Hereinafter, some embodiments of the present disclosure will be described in detail with reference to exemplary drawings. In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting," "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to," "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element may be included in at least one of two or more elements that "are connected or coupled to," "contact or overlap," etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

Hereinafter, various embodiments of the present disclosure will be described in detail with reference to the accompanying drawings.

FIG. 1 is a schematic diagram illustrating a configuration of a display device according to embodiments of the present disclosure.

Referring to FIG. 1, a display device 100 according to embodiments of the present disclosure may include a display panel 110 which is connected to a plurality of gate lines GL and a plurality of data lines DL and in which a plurality of subpixels SP are disposed in the form of a matrix, a gate driving circuit 120 which provides signals to the plurality of gate lines GL, a data driving circuit 130 which supplies a data voltage through the plurality of data lines DL, a timing controller 140 for controlling the gate driving circuit 120 and the data driving circuit 130, and a temperature sensor 150 for detecting a temperature (e.g., a characteristic) of the display panel 110.

The display panel 110 displays an image based on scan signals transmitted from the gate driving circuit 120 through the plurality of gate lines GL and data voltages transmitted from the data driving circuit 130 through the plurality of data lines DL.

In the case of a liquid crystal display device, the display panel 110 includes a liquid crystal layer formed between two substrates and may operate in any known mode such as a twisted nematic (TN) mode, a vertical alignment (VA) mode, an in plane switching (IPS) mode, or a fringe field switching (FFS) mode. Meanwhile, in the case of an organic light-emitting display device, the display panel 110 may be implemented in a top emission method, a bottom emission method, or a dual emission method.

In the display panel 110, a plurality of pixels may be disposed in the form of a matrix. Each pixel may be formed of subpixels SP having different colors, for example, a white subpixel, a red subpixel, a green subpixel, and a blue subpixel, and each sub-pixel SP may be defined by the plurality of data lines DL and the plurality of gate lines GL.

One subpixel SP may include a thin film transistor (TFT), a light-emitting element which emits light according to the data voltage, and a storage capacitor electrically connected to the light-emitting element to maintain a voltage, which are disposed in an area formed by one data line DL and one gate line GL.

For example, when the display device 100 having a 2,160×3,840 resolution is formed of four subpixels SP, including a white (W) subpixel, a red (R) subpixel, a green (G) subpixel, and a blue (B) sub-pixel, because there are 2,160 gate lines GL and 3,840 data lines DL connected to the four subpixels (WRGB), a total of 3,840×4=15,360 data lines DL may be provided, and the subpixels SP may be disposed in areas formed by the gate lines GL and the data lines DL.

The gate driving circuit 120 is controlled by the timing controller 140 and sequentially outputs scan signals to the plurality of gate lines GL disposed in the display panel 110 to control driving timings of the plurality of subpixels SP.

In the display device 100 having a 2,160×3,840 resolution, a case in which scan signals are sequentially output from the first gate line to the 2,160th gate line with respect to the 2,160 gate lines GL may be referred to as 2,160-phase driving. Alternatively, as in a case of sequentially outputting scan signals from the first gate line to the fourth gate line and then sequentially outputting the scan signals from the fifth gate line to the eighth gate line, a case in which scan signals are sequentially output on basis of four gate lines GL may be referred to as four-phase driving. That is, a case in which scan signals are sequentially output for every N gate lines GL may be referred to as N-phase driving.

In this case, the gate driving circuit 120 may include one or more gate driving integrated circuits GDIC, and according to a driving method, the gate driving circuit 120 may be positioned on only one side or both sides of the display panel 110. Alternatively, the gate driving circuit 120 may be directly formed in a bezel area of the display panel 110 to be implemented in the form of a gate in panel (GIP).

The data driving circuit 130 receives digital image data DATA from the timing controller 140 and converts the received digital image data DATA into an analog data voltage. Then, the data voltage is output to each data line DL according to a timing when the scan signal is applied through the gate line GL, and thus each subpixel SP connected to the data line DL displays a light emission signal with a brightness corresponding to the data voltage.

Similarly, the data driving circuit 130 may include one or more source driving integrated circuits SDIC, and the source driving integrated circuits SDIC may be connected to a bonding pad of the panel 110 or may be directly disposed on the display panel 110 using a tape automated bonding (TAB) method or a chip on glass (COG) method.

In some cases, each source driving integrated circuit SDIC may be integrated and disposed in the display panel 110. In addition, each source driving integrated circuit SDIC may be implemented in a chip on film (COF) method. In this case, each source driving integrated circuit SDIC may be mounted on a circuit film and may be electrically connected to the data lines DL of the display panel 110 through the circuit film.

The timing controller 140 supplies various control signals to the gate driving circuit 120 and the data driving circuit 130 to control operations of the gate driving circuit 120 and the data driving circuit 130. That is, the timing controller 140 controls the gate driving circuit 120 to output a scan signal according to a timing implemented in each frame, and on the other hand, the timing controller 140 transmits digital image data DATA received from an external component to the data driving circuit 130.

In this case, in addition to the digital image data DATA, the timing controller 140 receives various timing signals including a vertical synchronization signal Vsync, a horizontal synchronization signal Hsync, a data enable signal DE, and a main clock MCLK from an external component (e.g., a host system). Accordingly, the timing controller 140 generates control signals using the various timing signals received from the external component and transmits the control signals to the gate driving circuit 120 and the data driving circuit 130.

For example, in order to control the gate driving circuit 120, the timing controller 140 outputs various gate control signals including a gate start pulse GSP, a gate clock GCLK, and a gate output enable signal GOE. Here, the gate start pulse GSP controls timings at which one or more GDICs constituting the gate driving circuit 120 start to operate. In addition, the gate clock GCLK is a clock signal commonly input to the one or more gate driving integrated circuits GDIC and controls a shift timing of the scan signal. In addition, the gate output enable signal GOE specifies timing information of the one or more gate driving integrated circuits GDIC.

In addition, in order to control the data driving circuit 130, the timing controller 140 outputs various data control signals including a source start pulse SSP, a source sampling clock SCLK, and a source output enable signal SOE. Here, the source start pulse SSP controls timings at which the one or more SDICs constituting the data driving circuit 130 start to sample data. The source sampling clock SCLK is a clock signal for controlling a timing at which the SDIC samples data. The source output enable signal SOE controls an output timing of the data driving circuit 130.

In order to measure a temperature of a partial area or the entire area of the display panel 110, one or more temperature sensors 150 may be disposed at arbitrary positions within a bezel area that does not display an image in the display panel 110. A temperature value indicative of the temperature of the display panel 110 detected by the temperature sensor 150 may be transmitted to the timing controller 140, and the timing controller 140 may compensate the digital image data DATA according for the detected temperature value and supply the compensated digital image data to the display panel 110 through the data driving circuit 130.

The display device 100 may further include a power management circuit for supplying various voltages or currents to the display panel 110, the gate driving circuit 120, or the data driving circuit 130 or controlling various voltages or various currents which are to be supplied.

Meanwhile, the light-emitting element may be disposed in each subpixel SP. For example, an organic light-emitting display device may include a light-emitting element such as a light-emitting diode (LED) at each subpixel SP and display an image by controlling a current flowing in the light-emitting element according to a data voltage. Various types of devices such as a liquid crystal display (LCD) device, an organic light-emitting display device, and a plasma display panel may be applied as the display device.

Figure 2:
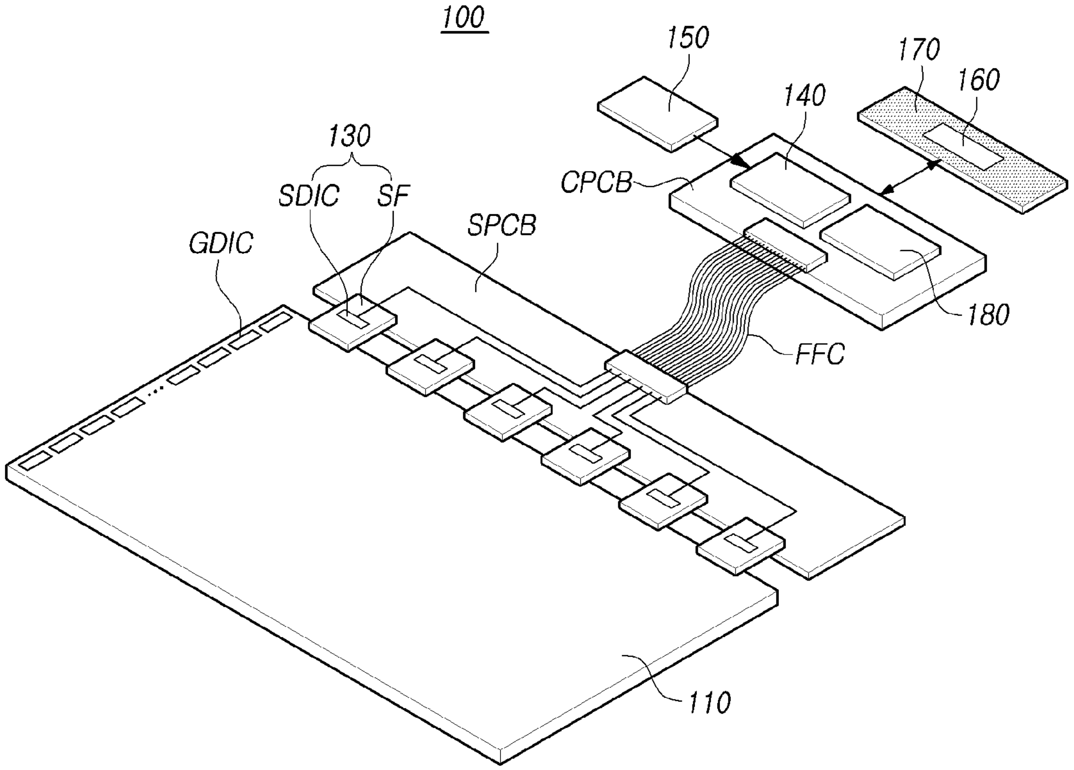
FIG. 2 is an exemplary system diagram illustrating a display device according to embodiments of the present disclosure.

FIG. 2 is an exemplary system diagram illustrating a display device according to embodiments of the present disclosure.

FIG. 2 shows the display device 100 according to embodiments of the present disclosure in which the SDICs included in the data driving circuit 130 are implemented using a COF method among various methods (TAB, COG, and COF) and the gate driving circuit 120 is implemented in the form of a GIP among various methods (TAB, COG, COF, and GIP).

When the gate driving circuit 120 is implemented in the form of a GIP, the plurality of gate driving integrated circuits GDIC included in the gate driving circuit 120 may be directly formed in a non-display area of the display panel 110. In this case, the gate driving integrated circuit GDIC may receive various signals (a clock signal, a gate high signal, and a gate low signal) required for generating a scan signal through gate driving related signal lines disposed in the non-display area.

Similarly, the one or more source driving integrated circuits SDIC included in the data driving circuit 130 may each be mounted on a source film SF, and one side of the source film SF may be electrically connected to the display panel 110. In addition, lines for electrically connecting the source driving integrated circuit SDIC to the display panel 110 may be disposed on the source film SF.

The display device 100 may include at least one source printed circuit board SPCB for electrically connecting the plurality of source driving integrated circuits SDIC to other devices, and a control printed circuit board CPCB for mounting control components and various electric devices.

In this case, one side of the source film SF on which the source driving integrated circuit SDIC is mounted may be connected to the at least one source printed circuit board SPCB. That is, the one side of the source film SF on which the source driving integrated circuit SDIC is mounted may be electrically connected to the display panel 110, and the other side thereof may be electrically connected to the source printed circuit board SPCB.

The timing controller 140 and the power management circuit 180 may be mounted on the control printed circuit board CPCB. The timing controller 140 may control operations of the data driving circuit 130 and the gate driving circuit 120. The power management circuit 180 may supply a driving voltage or current to the display panel 110, the data driving circuit 130, and the gate driving circuit 120 and control a voltage or current to be supplied.

At least one source printed circuit board SPCB and at least one control printed circuit board CPCB may be electrically connected through at least one connection member, and the connection member may be formed as, for example, a flexible printed circuit FPC, a flexible flat cable FFC, or the like. In addition, the at least one source printed circuit board SPCB and the at least one control printed circuit board CPCB may be implemented to be integrated into one printed circuit board.

The display device 100 may further include a set board 170 electrically connected to the control printed circuit board CPCB. In this case, the set board 170 may be referred to as a power board. A main power management circuit 160 for managing the total power of the display device 100 may be present in the set board 170. The main power management circuit 160 may interlink with the power management circuit 180.

In the case of the display device 100 having the above configuration, the driving voltage is generated from the set board 170 and transmitted to the power management circuit 180 on the control printed circuit board CPCB. The power management circuit 180 transmits a driving voltage required for driving a display or detecting a characteristic value to the source printed circuit board SPCB through the flexible printed circuit FPC or the flexible flat cable FFC. The driving voltage transmitted to the source printed circuit board SPCB is supplied through the source driving integrated circuit SDIC to drive a specific subpixel SP in the display panel 110 to emit light or to sense the specific subpixel SP.

In this case, each subpixel SP disposed in the display panel 110 of the display device 100 may include the light-emitting element and a circuit element such as a driving transistor for driving the light-emitting element.

The type and number of circuit elements constituting each subpixel SP may be variously determined according to a provided function and a design method.

Figure 3:
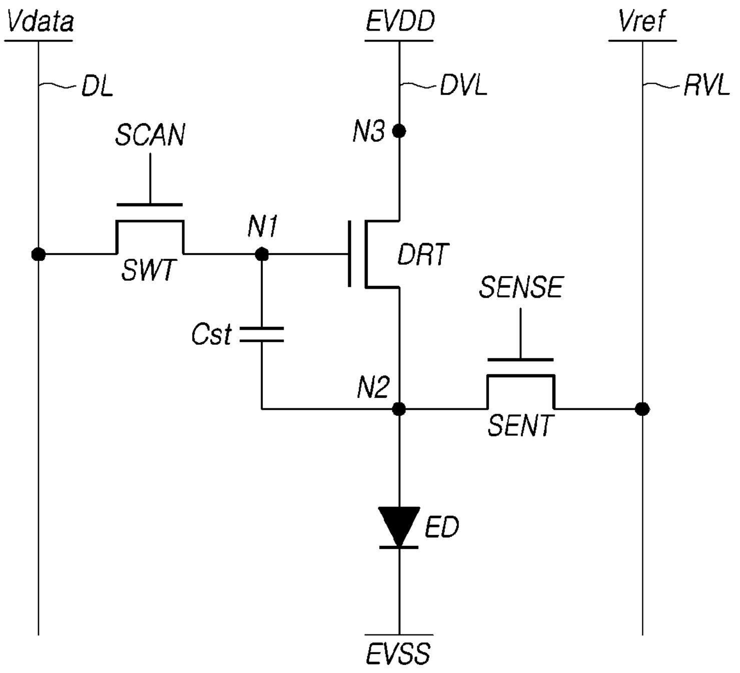
FIG. 3 is an exemplary diagram illustrating a circuit constituting a subpixel in a display device according to embodiments of the present disclosure.

FIG. 3 is an exemplary diagram illustrating a circuit constituting a subpixel in a display device according to embodiments of the present disclosure.

Referring to FIG. 3, in the display device 100 according to embodiments of the present disclosure, the subpixel SP may include one or more transistors and capacitors, and an organic light-emitting diode (OLED) may be disposed as a light-emitting element ED.

For example, the subpixel SP may include a driving transistor DRT, a switching transistor SWT, a sensing transistor SENT, a storage capacitor Cst, and the light-emitting element ED.

The driving transistor DRT has a first node N1, a second node N2, and a third node N3. The first node N1 of the driving transistor DRT may be a gate node to which a data voltage Vdata is applied from the data driving circuit 130 through the data line DL when the switching transistor SWT is turned on. The second node N2 of the driving transistor DRT may be electrically connected to an anode electrode of the light-emitting element ED and may be a source node or a drain node. The third node N3 of the driving transistor DRT is electrically connected to a driving voltage line DVL to which a driving voltage EVDD is applied and may be a drain node or a source node.

In this case, the driving voltage EVDD required for displaying an image may be supplied to the driving voltage line DVL during a display driving period. For example, the driving voltage EVDD required for displaying an image may be 27 V.

The switching transistor SWT is electrically connected between the first node N1 of the driving transistor DRT and the data line DL, and operates according to a scan signal SCAN supplied through the gate line GL being connected to the gate node. In addition, when turned on, the switching transistor SWT transmits the data voltage Vdata supplied through the data line DL to the gate node of the driving transistor DRT to control an operation of the driving transistor DRT.

The sensing transistor SENT is electrically connected between the second node N2 of the driving transistor DRT and a reference voltage line RVL, the gate line GL is connected to the gate node, and thus the sensing transistor SENT operates according to a scan signal SENSE supplied through the gate line GL. When turned on, the sensing transistor SENT transmits a sensing reference voltage Vref supplied through the reference voltage line RVL to the second node N2 of the driving transistor DRT.

That is, by controlling the switching transistor SWT and the sensing transistor SENT, a voltage of the first node N1 and a voltage of the second node N2 of the driving transistor DRT are controlled so that a current for driving the light-emitting element ED may be supplied.

The gate nodes of the switching transistor SWT and the sensing transistor SENT may be connected to one gate line GL or to different gate lines GL. Here, an example of a structure in which the switching transistor SWT and the sensing transistor SENT are connected to different gate lines GL is shown. In this case, the switching transistor SWT and the sensing transistor SENT may be independently controlled by the scan signal SCAN and the sense signal SENSE which are transmitted through the different gate lines GL.

On the other hand, when the switching transistor SWT and the sensing transistor SENT are connected to one gate line GL, the switching transistor SWT and the sensing transistor SENT may be simultaneously controlled by the scan signal SCAN or the sense signal SENSE transmitted through one gate line GL, and an aperture ratio of the subpixel SP may increase.

Meanwhile, the transistor disposed in the subpixel SP may be formed of a p-type transistor as well as an n-type transistor. Here, an example in which the transistor is formed of an n-type transistor is shown.

The storage capacitor Cst is electrically connected between the first node N1 and the second node N2 of the driving transistor DRT and maintains the data voltage Vdata for one frame.

According to a type of the driving transistor DRT, the storage capacitor Cst may be connected between the first node N1 and the third node N3 of the driving transistor DRT.

The anode electrode of the light-emitting element ED may be electrically connected to the second node N2 of the driving transistor DRT, and a base voltage EVSS may be applied to a cathode electrode of the light-emitting element ED.

Here, the base voltage EVSS may be a ground voltage or a voltage that is greater or less than the ground voltage. In addition, the base voltage EVSS may vary according to a driving state. For example, a base voltage EVSS at a time of display driving and a base voltage EVSS at a time of sensing driving may be set differently.

The above-described example of the structure of the subpixel SP is a three transistor (3T)-one capacitor (1C) structure, this is merely an example for description, and the structure may additionally include one or more transistors or, in some cases, one or more capacitors. Alternatively, the plurality of sub-pixels SP may each have the same structure, or some of the plurality of sub-pixels SP may have different structures.

In order to effectively detect a characteristic value of the driving transistor DRT, for example, a threshold voltage or mobility, the display device 100 according to embodiments of the present disclosure may use a method of measuring a current flowing due to a voltage charged in the storage capacitor Cst during a characteristic value sensing period of the driving transistor DRT, and this is referred to as current sensing.

That is, by measuring the current flowing due to the voltage charged in the storage capacitor Cst during the characteristic value sensing period of the driving transistor DRT, it is possible to detect the characteristic value or a change in characteristic value of the driving transistor DRT in the subpixel SP.

In this case, since the reference voltage line RVL not only serves to transmit the reference voltage Vref, but also serves as a sensing line for sensing the characteristic value of the driving transistor DRT in the subpixel SP, the reference voltage line RVL may be referred to as a sensing line.

Figure 4:
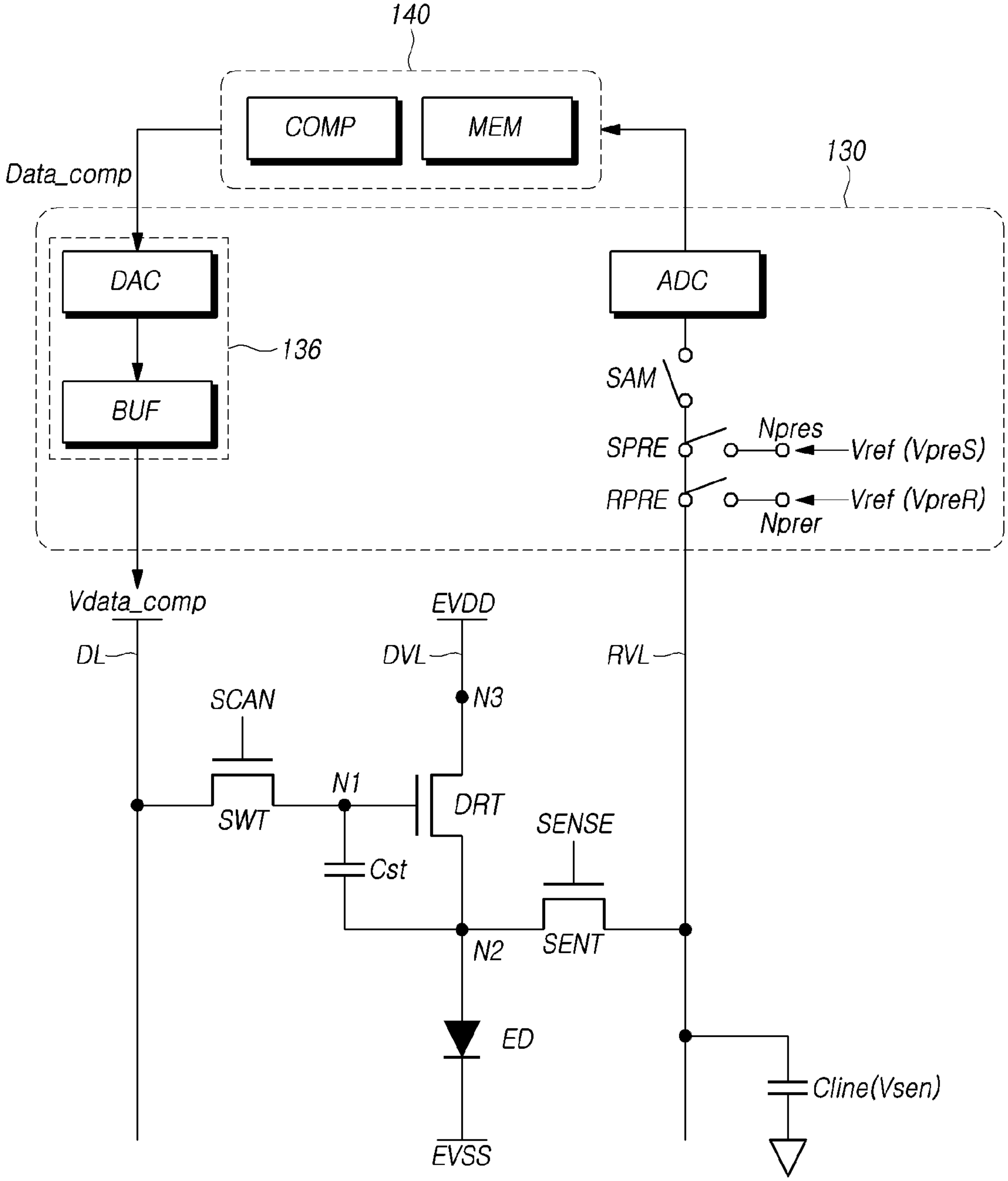
FIG. 4 is a diagram illustrating an exemplary circuit structure for sensing characteristic values of a driving transistor in a display device according to embodiments of the present disclosure.

FIG. 4 is a diagram illustrating an exemplary circuit structure for sensing characteristic values of a driving transistor in a display device according to embodiments of the present disclosure.

Referring to FIG. 4, the display device 100 according to embodiments of the present disclosure may include components for compensating data voltages due to a characteristic value deviation of the driving transistor DRT.

For example, the characteristic value or the change in characteristic value of the driving transistor DRT may be reflected as a voltage (e.g., Vdata-Vth) of the second node N2 of the driving transistor DRT. In a state in which the sensing transistor SENT is turned on, the voltage of the second node N2 of the driving transistor DRT may correspond to a voltage of the reference voltage line RVL. In addition, a line capacitor Cline of the reference voltage line RVL may be charged with the voltage of the second node N2 of the driving transistor DRT, and the reference voltage line RVL may have a voltage corresponding to the voltage of the second node N2 of the driving transistor DRT by a sensing voltage Vsen charged in the line capacitor Cline.

The display device 100 may include an analog-to-digital conversion ADC for measuring the voltage of the reference voltage line RVL corresponding to the voltage of the second node N2 of the driving transistor DRT to convert the measured voltage into a digital value, and switch circuits SAM and SPRE for sensing characteristic values.

The switch circuits SAM and SPRE for controlling characteristic value sensing driving may include a sensing reference switch SPRE for controlling a connection between the reference voltage line RVL and a sensing reference voltage supply node Npres to which the reference voltage Vref is supplied, and a sampling switch SAM for controlling a connection between the reference voltage line RVL and the analog-to-digital converter ADC. Here, the sensing reference switch SPRE is a switch for controlling characteristic value sensing driving, and the reference voltage Vref supplied to the reference voltage line RVL by the sensing reference switch SPRE becomes a sensing reference voltage VpreS.

In addition, the switch circuit for sensing the characteristic value of the driving transistor DRT may include a display reference switch RPRE for controlling display driving. The display reference switch RPRE may control a connection between the reference voltage line RVL and a display reference voltage supply node Nprer to which the reference voltage Vref is supplied. The display reference switch RPRE is a switch used in display driving, and the reference voltage Vref supplied to the reference voltage line RVL by the display reference switch RPRE corresponds to a display reference voltage VpreR.

In this case, the sensing reference switch SPRE and the display reference switch RPRE may be provided separately or may be implemented to be integrated into one component. The sensing reference voltage VpreS and the display reference voltage VpreR may have the same voltage value or different voltage values.

The timing controller 140 of the display device 100 may include a memory MEM which stores data transmitted from the analog-to-digital converter ADC or pre-stores reference values, and a compensation circuit COMP for compensating the data voltage for a deviation of the characteristic values by comparing the received data with the reference value stored in the memory MEM. In this case, a compensation value calculated by the compensation circuit COMP may be stored in the memory MEM.

Thus, the timing controller 140 may compensate for image data DATA to be supplied to the data driving circuit 130 using the compensation value calculated by the compensation circuit COMP and output compensated image data DATA_comp to the data driving circuit 130. Accordingly, the data driving circuit 130 may convert the compensated image data DATA_comp into a compensated data voltage Vdata_comp in an analog form through the digital-to-analog converter DAC and output the compensated data voltage Vdata_comp to a corresponding data line DL through an output buffer BUF. Consequently, the characteristic value deviation (a threshold voltage deviation or a mobility deviation) of the driving transistor DRT in the corresponding subpixel SP may be compensated for.

As described above, a period during which the characteristic values (a threshold voltage and/or mobility) of the driving transistor DRT are sensed may proceed after a power-on signal is generated and before the display driving starts. For example, when the power-on signal is applied to the display device 100, the timing controller 140 loads parameters required for driving the display panel 110 and then performs the display driving. In this case, the parameters necessary for driving the display panel 110 may include information on the characteristic value sensing and the compensation previously performed in the display panel 110, and the characteristic values of the driving transistor DRT (the threshold voltage and the mobility) may be sensed during the parameter loading process. In this way, the process in which the characteristic value is sensed before the subpixel emits light after the power-on signal is generated is referred to as an on-sensing process.

Alternatively, the period during which the characteristic values of the driving transistor DRT are sensed may proceed after a power-off signal of the display device 100 is generated. For example, when the power-off signal is generated in the display device 100, the timing controller 140 may cut off the data voltage supplied to the display panel 110 and perform sensing of the characteristic values of the driving transistor DRT for a certain period of time. In this way, the process in which the characteristic value sensing is performed in a state in which the power-off signal is generated, the data voltage is cut off, and thus the light emission of subpixel is terminated is referred to as an off-sensing process.

In addition, the characteristic value sensing period of the driving transistor DRT may be performed in real-time during the display driving. This sensing process is referred to as a real-time (RT) sensing process. In the RT sensing process, the sensing process may be performed for one or more subpixels SP in one or more subpixel SP lines during each blank period of the display driving period.

That is, a blank period during which the data voltage is not supplied to the subpixel SP may be present within a first frame or between an $n^{th}$ frame and an $(n+1)^{th}$ frame during the display driving period during which an image is displayed on the display panel 110, and mobility sensing for one or more subpixels SP may be performed during the blank period. In other words, the data voltage supplied to the subpixel SP is maintained during the blank period.

In this way, when the sensing process is performed during the blank period, the subpixel SP line in which the sensing process is performed may be randomly selected. In addition, after the sensing process is performed during the blank period, the compensated data voltage Vdata_comp may be supplied to the subpixel SP where the sensing process is performed during the display driving period. Thus, after the sensing process during the blank period, an abnormal phenomenon in the subpixel SP line where the sensing process is completed during the display driving period may be reduced.

Meanwhile, the data driving circuit 130 may include a data voltage output circuit 136 including a latch circuit, a digital-to-analog converter DAC, and the output buffer BUF. In some cases, the data driving circuit 130 may further include the analog-to-digital converter (ADC) and the various switches SAM, SPRE, and RPRE. Alternatively, the analog-to-digital converter (ADC) and the various switches SAM, SPRE, and RPRE may be positioned outside the data driving circuit 130.

In addition, the compensation circuit COMP may be outside the timing controller 140 or may be included inside the timing controller 140, and the memory MEM may be positioned outside the timing controller 140 or may be implemented in the form of a register inside the timing controller 140.

Figure 5:
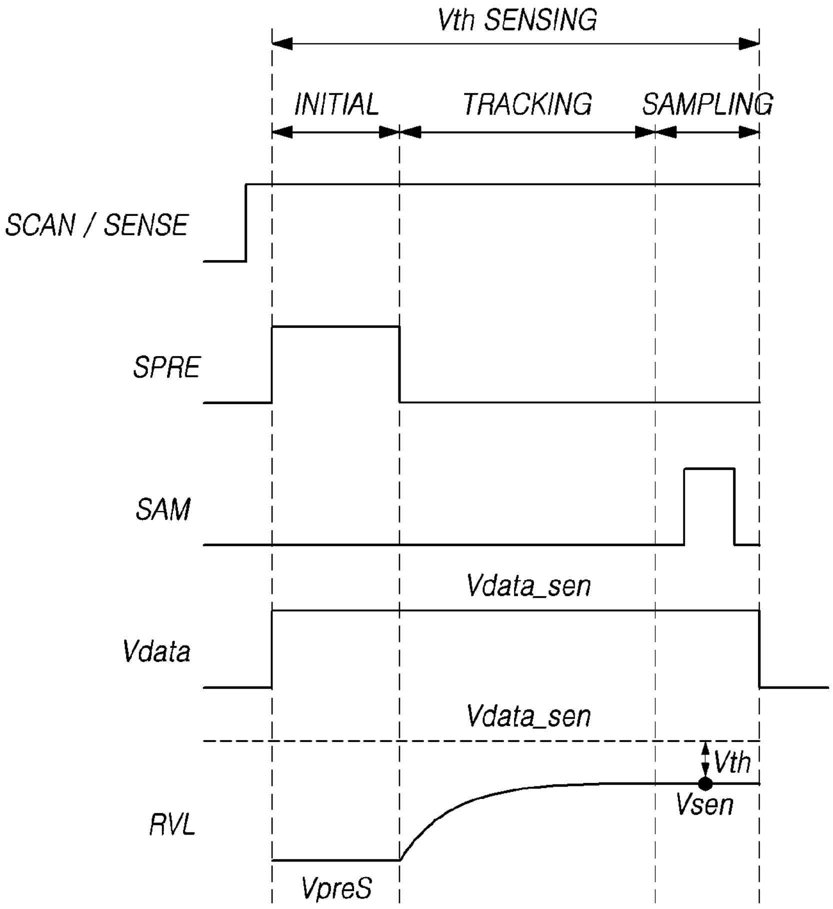
FIG. 5 is a diagram illustrating a driving timing diagram for threshold voltage sensing among characteristic values of a driving transistor in a display device according to embodiments of the present disclosure.

FIG. 5 is a diagram illustrating a driving timing diagram for threshold voltage sensing among characteristic values of a driving transistor in a display device according to embodiments of the present disclosure.

Referring to FIG. 5, in the display device 100 according to embodiments of the present disclosure, a threshold voltage sensing period Vth SENSING may include an initialization period INITIAL, a tracking period TRACKING, and a sampling period SAMPLING.

During the initialization period INITIAL, the first switching transistor SWT is turned on by a scan signal SCAN of a turn-on level. Thus, the first node N1 of the driving transistor DRT is initialized at a sensing data voltage Vdata_sen for threshold voltage sensing. The sensing data voltage Vdata_sen is a predetermined voltage in one embodiment.

In addition, during the initialization period INITIAL, the sensing transistor SENT is turned on and the sensing reference switch SPRE is turned on by a sense signal SENSE having a turn-on level voltage. Thus, the second node N2 of the driving transistor DRT is initialized at the sensing reference voltage VpreS.

The tracking period TRACKING is a period during which an operation of tracking a threshold voltage Vth of the driving transistor DRT is performed. That is, during the tracking period TRACKING, a voltage of the second node N2 of the driving transistor DRT, which reflects the threshold voltage Vth of the driving transistor DRT, is tracked.

During the tracking period TRACKING, the switching transistor SWT and the sensing transistor SENT each maintain the turn-on states, and the sensing reference switch SPRE is turned off. Thus, the state of the second node N2 of the driving transistor DRT becomes a floating state, and the voltage of the second node N2 of the driving transistor DRT starts to rise from the sensing reference voltage VpreS.

In this case, since the sensing transistor SENT is in the turn-on state, the rising of the voltage of the second node N2 of the driving transistor DRT causes a rising of the voltage of the reference voltage line RVL.

The voltage of the second node N2 of the driving transistor DRT rises and then becomes saturated. The voltage saturated at the second node N2 of the driving transistor DRT corresponds to a difference (Vdata_sen−Vth) between the sensing data voltage Vdata_sen for the threshold voltage and the threshold voltage Vth of the driving transistor DRT.

Therefore, when the voltage of the second node N2 of the driving transistor DRT is saturated, the voltage of the reference voltage line RVL corresponds to the difference (Vdata_sen−Vth) between the sensing data voltage Vdata_sen for the threshold voltage and the threshold voltage Vth of the driving transistor DRT.

When the voltage of the second node N2 of the driving transistor DRT is saturated, the sampling switch SAM is turned on, and the sampling period SAMPLING proceeds.

During the sampling period SAMPLING, the analog-to-digital converter ADC may detect the sensing voltage Vsen of the reference voltage line RVL connected by the sampling switch SAM and convert the sensing voltage Vsen into sensing data corresponding to a digital value. Here, the sensing voltage Vsen transmitted by the analog-to-digital converter ADC corresponds to "Vdata_sen−Vth."

The compensation circuit COMP may determine a threshold voltage of the driving transistor DRT positioned in the corresponding subpixel SP on the basis of the sensing data output from the analog-to-digital converter ADC, and may compensate the threshold voltage of the driving transistor DRT accordingly.

That is, the compensation circuit COMP may determine the threshold voltage Vth of the driving transistor DRT from the sensing data (the digital data corresponding to Vdata_sen−Vth) measured through the threshold voltage sensing operation and the sensing data (the digital data corresponding to Vdata_sen) for the threshold voltage.

The compensation circuit COMP may compensate for a deviation in threshold voltage between driving transistors DRT by comparing the threshold voltage Vth determined for the corresponding driving transistor DRT with a reference threshold voltage or a threshold voltage of the other driving transistor DRT. Here, the deviation compensation of the threshold voltage may be a process of changing the data voltage Vdata into the compensated data voltage Vdata_comp, that is, a process of multiplying the data voltage Vdata by a compensation gain G (e.g., Vdata_comp=G*Vdata).

Therefore, when the deviation of the threshold voltage increases, the compensation gain G by which the data voltage Vdata is multiplied may increase.

Figure 6:
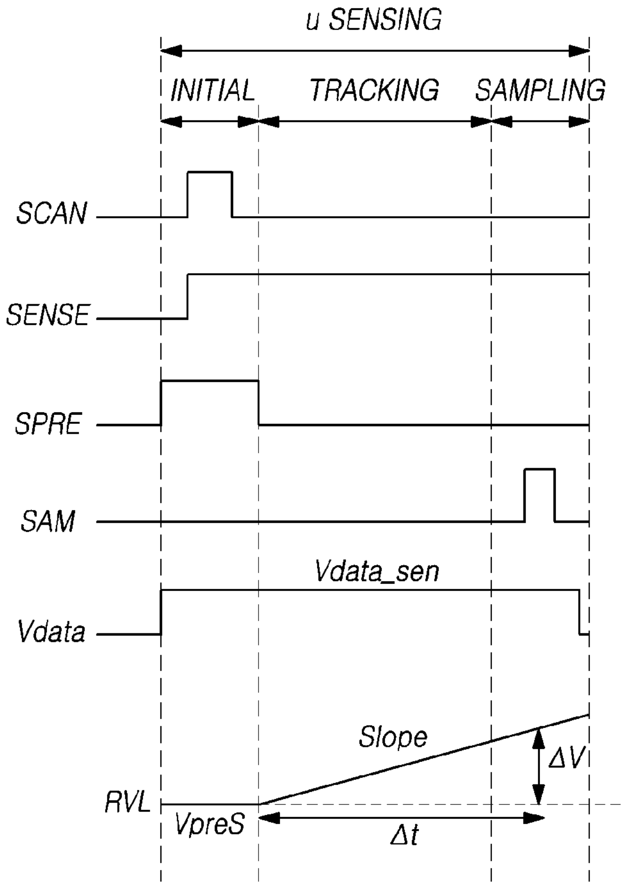
FIG. 6 is a diagram illustrating a driving timing diagram for mobility sensing among characteristic values of a driving transistor in a display device according to embodiments of the present disclosure.

FIG. 6 is a diagram illustrating a driving timing diagram for mobility sensing among characteristic values of a driving transistor in a display device according to embodiments of the present disclosure.

Referring to FIG. 6, in the display device 100 according to embodiments of the present disclosure, similar to the threshold voltage sensing operation, a mobility sensing period u SENSING of the driving transistor DRT may include an initialization period INITIAL, a tracking period TRACKING, and a sampling period SAMPLING.

Since mobility of the driving transistor DRT is generally sensed by individually turning the switching transistor SWT and the sensing transistor SENT on or off, a sensing operation may be performed with a structure in which a scan signal SCAN and a sense signal SENSE are individually applied to the switching transistor SWT and the sensing transistor SENT through two gate lines GL.

During the initialization period INITIAL, the switching transistor SWT is turned on by a scan signal SCAN of a turn-on level, and the first node N1 of the driving transistor DRT is initialized at a sensing data voltage Vdata_sen for mobility sensing (e.g., a predetermined voltage).

In addition, the sensing transistor SENT is turned on, and the sensing reference switch SPRE is turned on by a sense signal SENSE of a turn-on level. In this state, the second node N2 of the driving transistor DRT is initialized at the sensing reference voltage VpreS.

The tracking period TRACKING is a period during which an operation of tracking the mobility of the driving transistor DRT is performed. The mobility of the driving transistor DRT may represent a current driving capability of the driving transistor DRT. During the tracking period TRACKING, a voltage of the second node N2 of the driving transistor DRT, from which the mobility of the driving transistor DRT may be calculated, is tracked.

During the tracking period TRACKING, the switching transistor SWT is turned off by the scan signal SCAN of a turn-off level, and the sensing reference switch SPRE transitions to a turn-off level. Thus, both the first node N1 and the second node N2 of the driving transistor DRT are floated, and thus both the voltages of the first node N1 and the second node N2 of the driving transistor DRT rise. In particular, since the voltage of the second node N2 of the driving transistor DRT is initialized at the sensing reference voltage VpreS, the voltage of the second node N2 starts to rise from the sensing reference voltage VpreS. In this case, since the sensing transistor SENT is in the turn-on state, the rising of the voltage of the second node N2 of the driving transistor DRT causes a rising of the voltage of the reference voltage line RVL.

During the sampling period SAMPLING, the sampling switch SAM is turned on at a time when a predetermined time $\Delta t$ elapses from a time when the voltage of the second node N2 of the driving transistor DRT starts to rise. In this case, the analog-to-digital converter ADC may detect the sensing voltage Vsen of the reference voltage line RVL connected by the sampling switch SAM and convert the sensing voltage Vsen into sensing data in the form of a digital signal. Here, the sensing voltage Vsen applied to the analog-to-digital converter ADC may correspond to a voltage of a level VpreS+$\Delta$V rising as much as a predetermined voltage $\Delta$V from the sensing reference voltage VpreS.

The compensation circuit COMP may determine the mobility of the driving transistor DRT in the corresponding subpixel SP on the basis of the sensing data output from the analog-to-digital converter ADC and compensate for a deviation of the driving transistor DRT using the determined mobility. The compensation circuit COMP may determine the mobility of the driving transistor DRT from the sensing data VpreS+$\Delta$V measured through the mobility sensing operation, the known sensing reference voltage VpreS, and the elapsed time $\Delta t$.

That is, the mobility of the driving transistor DRT is proportional to a voltage variation $\Delta V/\Delta t$ per unit time of the reference voltage line RVL during the tracking period TRACKING and the sampling period SAMPLING, that is, a slope of a voltage waveform of the reference voltage line RVL. In this case, the compensation for mobility deviation for the driving transistor DRT may be a process of changing the data voltage Vdata, that is, an arithmetic operation of multiplying the data voltage Vdata by the compensation gain G. For example, the compensated data voltage Vdata_comp may be determined as a value obtained by multiplying the data voltage Vdata by the compensation gain G (Vdata_comp=G*Vdata).

Meanwhile, since the threshold voltage sensing operation of the driving transistor DRT may take a long time to saturate the voltage of the second node N2 of the driving transistor DRT, the threshold voltage sensing operation may be performed as the off-sensing process which may proceed for a longer time. On the other hand, since the mobility sensing operation of the driving transistor DRT may require a relatively short time compared to the threshold voltage sensing operation, the mobility sensing operation may be performed as the on-sensing process which proceeds for a short period of time or the RT sensing process.

Meanwhile, in order to reset the driving transistor DRT after performing the characteristic value sensing operation for the driving transistor DRT, the display device 100 of the present disclosure may apply a recovery voltage within the blank period.

Figure 7:
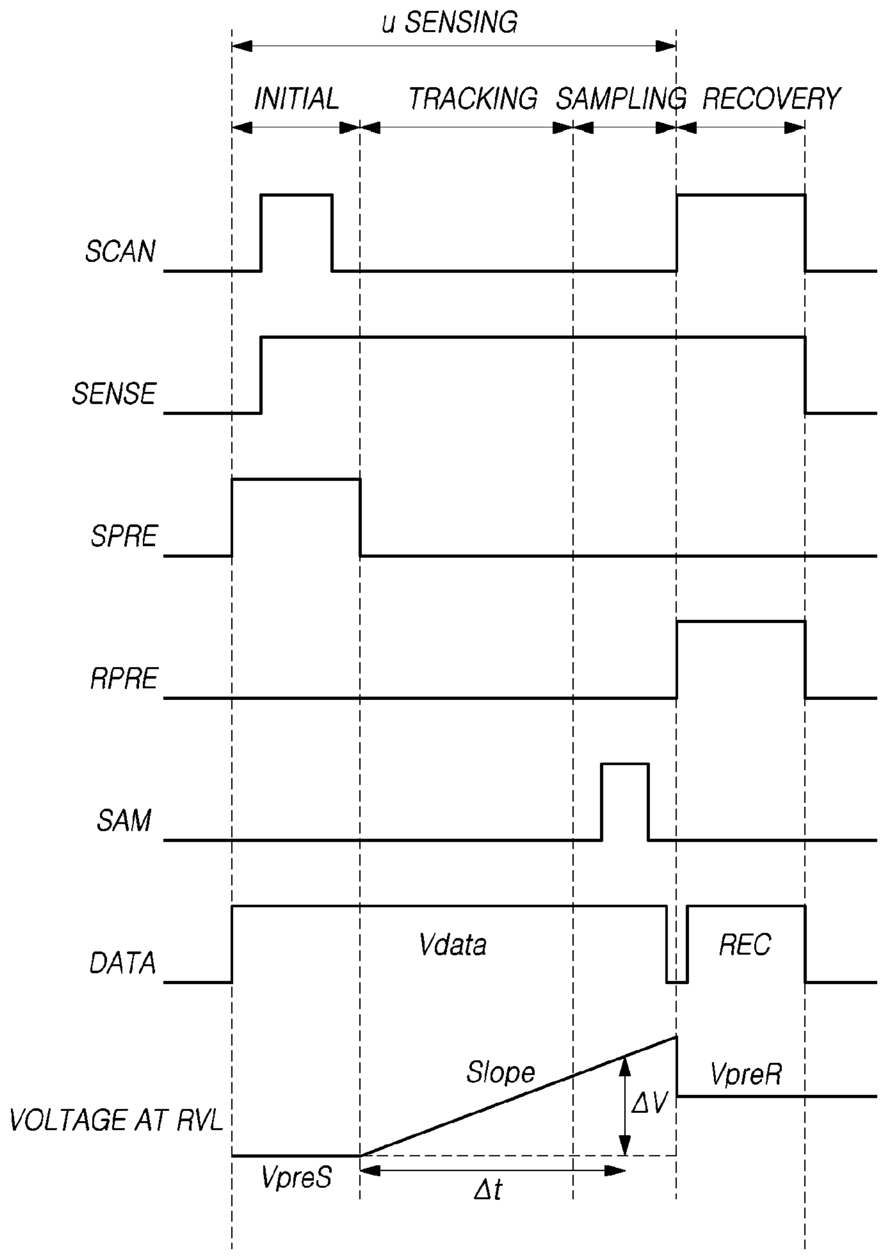
FIG. 7 is a diagram illustrating an example of a signal timing diagram for a case in which a recovery period is further included after a mobility sensing period of a driving transistor in a display device according to embodiments of the present disclosure.

FIG. 7 is a diagram illustrating an example of a signal timing diagram for a case in which a recovery period is further included after a mobility sensing period of a driving transistor in a display device according to embodiments of the present disclosure.

Referring to FIG. 7, the display device 100 according to embodiments of the present disclosure may further include a recovery period RECOVERY after the characteristic value sensing operation of a driving transistor DRT, in particular, the mobility sensing period u SENSING.

Since the mobility of the driving transistor DRT is generally sensed by individually turning the switching transistor SWT and the sensing transistor SENT on or off, a sensing operation may be performed with a structure in which a scan signal SCAN and a sense signal SENSE are applied to the switching transistor SWT and the sensing transistor SENT through two gate lines GL.

The initialization period INITIAL, the tracking period TRACKING, and the sampling period SAMPLING have been described above, and thus the descriptions thereof will be omitted.

When the voltage of the second node N2 of the driving transistor DRT is sensed during the sampling period SAMPLING, the recovery period RECOVERY may proceed. The recovery period RECOVERY may proceed during a predetermined period after the completion of the mobility sensing period u SENSING for the characteristic values of the driving transistor DRT and before the start of the display driving. That is, the recovery period RECOVERY may be regarded as a period during which a recovery voltage REC is applied in order to reset the voltage applied for the display driving after the characteristic value sensing operation of the driving transistor DRT. The recovery voltage REC (e.g., a predetermined voltage) may be applied through the reference voltage line RVL in a state in which the display reference switch RPRE is turned on.

Meanwhile, the display device 100 of the present disclosure may operate in a default mode in which the display device 100 operates at one fixed frequency and a variable refresh rate (VRR) mode in which the display device 100 operates at a plurality of variable frequencies according to a type of image data DATA input from an external host system.

Figure 8:
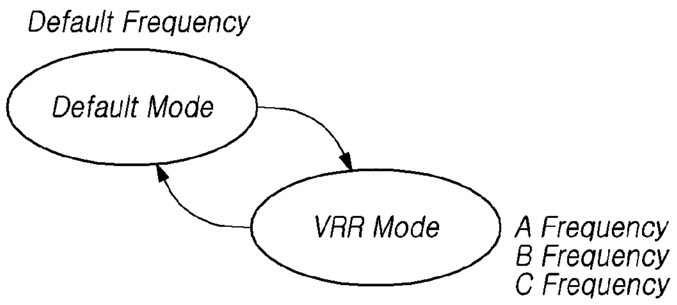
FIG. 8 is a diagram illustrating an example of a concept in which a default mode and a variable refresh rate mode are switched according to a type of image data in a display device according to embodiments of the present disclosure.

FIG. 8 is a diagram illustrating an example of a concept in which a default mode and a VRR mode are switched according to a type of image data in a display device according to embodiments of the present disclosure.

Referring to FIG. 8, the display device 100 according to embodiments of the present disclosure has a default mode in which general image data such as television (TV) images is displayed at a fixed frequency, and a VRR mode in which special image data such as game images or movies may be displayed at a plurality of variable frequencies according to a selected function.

However, the image data displayed in the default mode and the image data displayed in the VRR mode may be changed in various ways, and the image data described herein corresponds to some examples. In addition, operating modes classified according to whether a frequency displaying the image data varies may be expressed in various terms in addition to the default mode and the VRR mode.

For example, TV images may be displayed in a default mode driven by a fixed driving frequency of 120 Hz, and special images such as game images or movies may be displayed at a first frequency (e.g., A frequency) and, according to a manipulation, may be displayed at a variable frequency such as a second frequency (e.g., B frequency) or a third frequency (e.g., C frequency).

In summary, the default mode and the variable refresh rate mode may be regarded as a first operation mode and a second operation mode, respectively, according to whether a driving frequency for displaying the image data DATA on the display panel 110 is fixed or varies.

When the external host system transmits a TV image to the display device 100, the display device 100 may operate in the default mode in which the image data DATA is supplied through a fixed default frequency. When a special image such as a game image or a movie is supplied in a state in which the image data DATA is supplied at a fixed default frequency in the default mode, the host system may enter the VRR mode and supply the image data DATA while varying the driving frequency among the first frequency (A frequency), the second frequency (B frequency), and the third frequency (C frequency) according to a selected function.

Conversely, when the TV image is supplied again while operating in the VRR mode, the display device 100 may be changed to the default mode and supply the image data DATA at the fixed default frequency.

As described above, the operating mode of the display device 100 of the present disclosure may be divided into the default mode in which the display device 100 operates at the fixed default frequency and the VRR mode in which the display device 100 operates at the plurality of variable frequencies according to the type of the image data DATA supplied from the host system.

Meanwhile, in the process of changing the default mode to the VRR mode or changing the VRR rate mode to the default mode, the display device 100 of the present disclosure may supply image data of a specific brightness to the display panel 110 for a certain period of time to distinguish a mode before the change from a mode after the change.

For example, when the default mode is changed to the VRR mode, image data of A brightness may be applied to the display panel 110 for a certain period of time. Alternatively, when the VRR mode is changed to the default mode, image data of B brightness may be applied to the display panel 110 for a certain period of time.

Therefore, whether to change between the default mode and the VRR mode may be determined by detecting the brightness of the data voltage Vdata supplied from the data driving circuit 130 to the display panel 110 or by detecting brightness through a brightness detection camera.

In addition, when the driving frequency changes from the first frequency to the second frequency in the VRR mode, a range of the changed frequency may be determined by counting the number of horizontal synchronization signals during one frame period.

Figure 9:
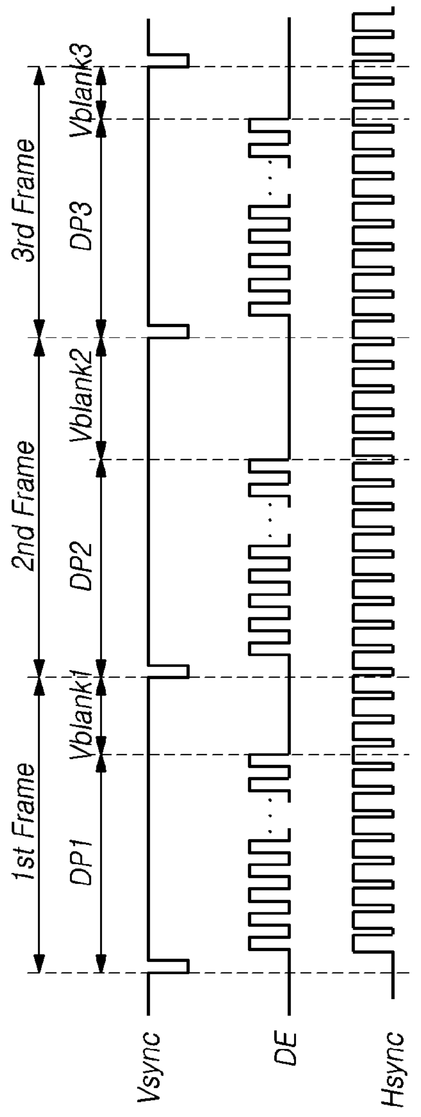
FIG. 9 is a diagram illustrating an example of signal waveforms in a variable refresh rate mode in which a vertical blank period changes according to a driving frequency in a display device according to embodiments of the present disclosure.

FIG. 9 is a diagram illustrating an example of signal waveforms in a VRR mode in which a vertical blank period is changed according to a driving frequency in a display device according to embodiments of the present disclosure.

Here, a data vertical synchronizing signal Vsync, a horizontal synchronizing signal Hsync, and an enable signal DE, which are supplied to the display device 100 from the host system, are shown.

Here, one frame may represent a time interval in which an image is output once for the entire section of the display panel 110, and specifically, one frame includes a display driving period DP in which an image is output and a vertical blank period Vblank in which an image is not output. In addition, a horizontal blank period may be included in the display driving period DP, and the horizontal blank period may be determined by the horizontal synchronization signal Hsync.

The image not being output during the vertical blank period Vblank may mean that the data enable signal DE remains at a low level so that the data voltage Vdata for implementing the image during the vertical blank period Vblank is not transmitted to the data line DL. That is, one frame may be a concept of time.

A first frame 1st Frame, a second frame 2nd Frame, and a third frame 3rd Frame indicate the order of one-frame periods. That is, the second frame 2nd Frame starts after the first frame 1st Frame, and the third frame 3rd Frame starts after the second frame 2nd Frame. Each of the first frame 1st Frame to the third frame 3rd Frame lasts for one frame period.

Here, one-frame periods of the first frame 1st Frame to the third frame 3rd Frame may be different from each other. In particular, in the first frame 1st Frame to the third frame 3rd Frame, display driving periods DP1, DP2, and DP3 may be the same, and vertical blank periods Vblank1, Vblank2, and Vblank3 may be set differently.

Referring to FIG. 9, in the display device 100 according to embodiments of the present disclosure, a first display driving period DP1 of the first frame 1st Frame, a second display driving period DP2 of the second frame 2nd Frame, and a third display driving period DP3 of the third frame 3rd Frame are the same.

On the other hand, a first vertical blank period Vblank1 of the first frame 1st Frame, a second vertical blank period Vblank2 of the second frame 2nd Frame, and a third vertical blank period Vblank3 of the third frame 3rd Frame may be set differently.

One frame period may be determined as a period between a falling time of the vertical synchronization signal Vsync and a falling time of a next vertical synchronization signal Vsync, and one frame period may be set differently for each frame.

The display driving period DP may include a plurality of horizontal periods, and one horizontal period may include a high level section of the data enable signal DE in which the image data DATA is applied and a horizontal blank period in which the image data DATA is not applied (a low level section of the data enable signal DE). In addition, the display driving period DP may include a plurality of horizontal periods corresponding to the number of gate lines GL constituting the display panel 110 and including the display driving period DP and the vertical blank period Vblank constituting one frame.

For example, when a default frequency set in the default mode is 120 Hz, the image data DATA of one frame may be repeatedly supplied 120 times for one second, and the one frame may have a time interval of 8.3 ms.

In this case, when the display panel 110 has a 2,160×3,840 resolution, 2,160 gate lines GL may be disposed in a vertical direction so that a data enable signal DE including 2,160 pulses may be applied to correspond to a time in which the 2,160 gate lines GL are turned on within one frame during the display driving period DP.

Meanwhile, although the data enable signal DE is applied in a pulse form during the display driving period DP, the data enable signal DE maintains a low level during the vertical blank period Vblank.

On the other hand, the horizontal synchronization signal Hsync may be applied in a pulse form not only during the display driving period DP but also during the vertical blank period Vblank. When a time interval of the vertical blank period Vblank varies according to the driving frequency in the VRR mode, the number of pulses of the horizontal synchronization signal Hsync included in one frame also varies. Accordingly, the driving frequency may be determined by detecting the number of pulses of the horizontal synchronization signal Hsync included in one frame. For example, the driving frequency may be determined by detecting the number of pulses of the horizontal synchronization signal Hsync included between a falling time and a next falling time of the vertical synchronization signal Vsync.

In this way, since a length of the vertical blank period Vblank changes when the operating mode changes or the driving frequency varies, a charging time due to the recovery voltage REC applied after the characteristic value sensing period is different for each driving frequency. Consequently, an image error due to a brightness deviation occurs at a time when the operating mode changes or the driving frequency varies.

Figure 10:
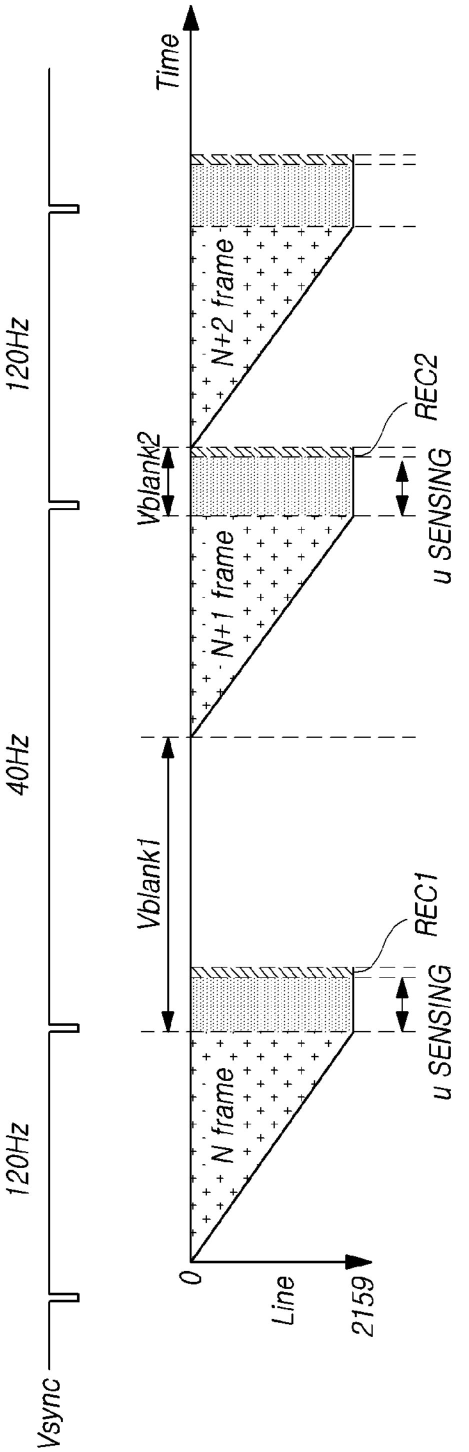
FIG. 10 is a diagram illustrating an example of a recovery voltage applied to a display panel according to a change of a driving frequency in a display device according to embodiments of the present disclosure.

FIG. 10 is a diagram illustrating an example of a recovery voltage applied to a display panel according to a change of a driving frequency in a display device according to embodiments of the present disclosure.

Referring to FIG. 10, the display device 100 according to embodiments of the present disclosure may select a subpixel SP during the vertical blank period Vblank, sense and compensate for mobility among the characteristic values of the driving transistor DRT, and apply the recovery voltage REC.

Here, the recovery period RECOVERY in which the recovery voltage REC is applied may proceed in a predetermined period after the mobility sensing period u SENSING of the driving transistor DRT is completed and before the display driving starts. That is, after the mobility sensing and compensation operation of the driving transistor DRT, the recovery voltage REC may be applied to reset the voltage applied for the display driving.

In this case, when the driving frequency of the display device 100 varies, since the vertical blank period Vblank changes, the charging time due to the recovery voltage REC applied after the mobility sensing period u SENSING also changes.

For example, when the display device 100 operates at a driving frequency of 120 Hz in an Nth frame and operates at a driving frequency of 40 Hz in an (N+1)th frame, the driving frequency of 40 Hz which varies may be confirmed by counting the number of pulses of the horizontal synchronizing signal Hsync applied between the vertical blank periods Vblank.

In this case, a level of the recovery voltage REC applied to the display panel 110 at a time when the driving frequency varies to 40 Hz has a value determined on the basis of the previous driving frequency of 120 Hz. Consequently, a recovery voltage REC1 corresponding to the previous driving frequency of 120 Hz is applied to the $(N+1)^{th}$ frame in which the driving frequency varies to 40 Hz, and thus the charging time changes and an image error due to a brightness deviation may occur.

Similarly, when the display device 100 operates at the driving frequency of 40 Hz in the (N+1)th frame and then operates at the driving frequency of 120 Hz in an (N+2)th frame, a level of a recovery voltage REC2 applied to the display panel 110 in the (N+2)th frame has a value determined on the basis of the previous driving frequency of 40 Hz and an image error due to a brightness deviation may occur in the (N+2)th.

The display device 100 of the present disclosure may reduce a characteristic value compensation error and improve image quality by changing compensation modes for the characteristic values of the driving transistor DRT according to a driving frequency variation.

Figure 11:
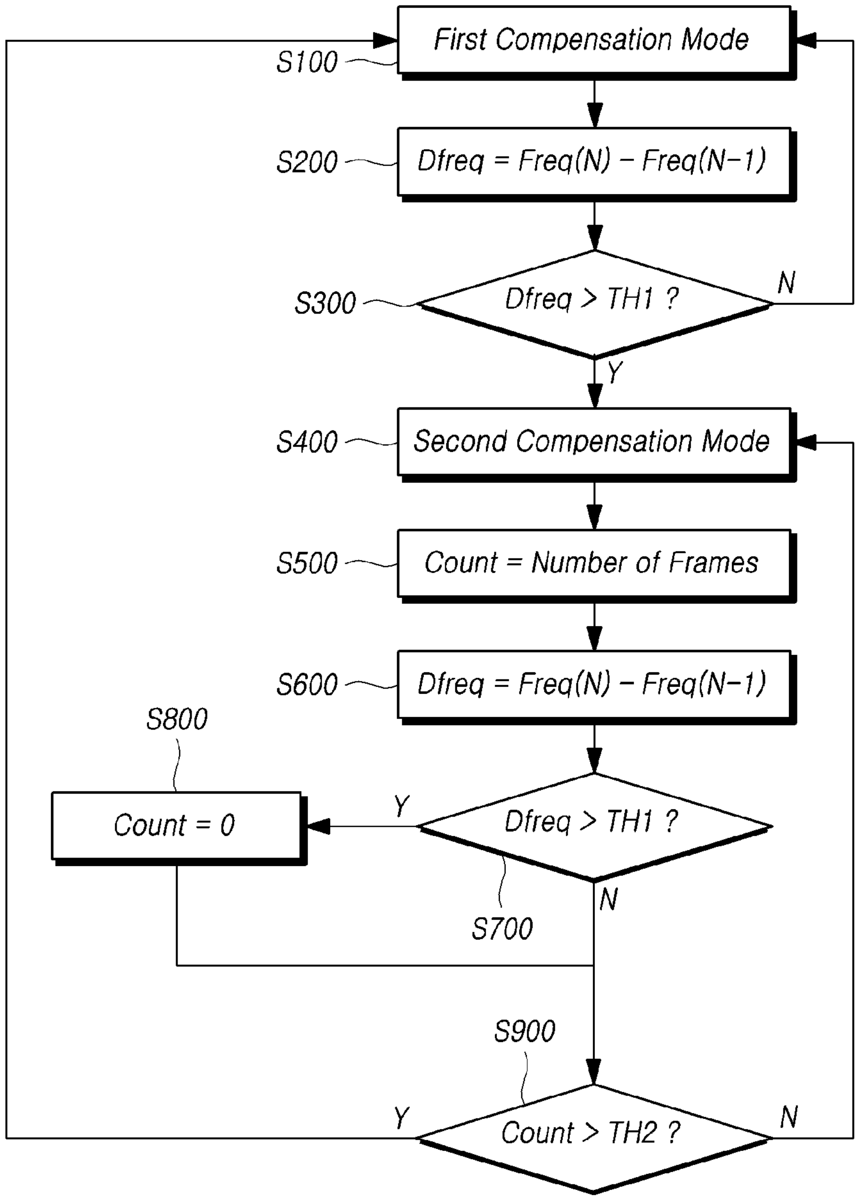
FIG. 11 is a flowchart illustrating a display driving method according to embodiments of the present disclosure.

FIG. 11 is a flowchart illustrating a display driving method according to embodiments of the present disclosure.

Referring to FIG. 11, a display driving method according to embodiments of the present disclosure may include operating in a first compensation mode (S100), calculating a driving frequency variation Dfreq between a current frame driving frequency Freq(N) and a previous frame driving frequency Freq(N−1) (S200), comparing the driving frequency variation Dfreq with a reference value TH1 (e.g., a threshold) (S300), when the driving frequency variation Dfreq is greater than the reference value TH1, operating in a second compensation mode (S400), counting the number of frames Count according to a frame change (S500), calculating a driving frequency variation Dfreq between a current frame driving frequency Freq(N) and a previous frame driving frequency Freq(N−1) in a changed frame (S600), comparing the driving frequency variation Dfreq with the reference value TH1 (S700), when the driving frequency variation Dfreq is found through the comparison to be greater than the reference value TH1, initializing (e.g., resetting) the number of frames Count to a predetermined value (e.g., zero) (S800), when the driving frequency variation Dfreq is less than or equal to the reference value TH1, comparing the counted number of frames Count with a reference frame threshold TH2 (S900), and when the counted number of frames Count is found through the comparison to be greater than the reference frame threshold TH2, operating in the first compensation mode, and when the counted frame count Count is less than the reference frame threshold TH2, operating in the second compensation mode.

Here, the first compensation mode is an operating mode in which the characteristic value (threshold voltage or mobility) of the driving transistor DRT is sensed through the RT sensing process for the entire area of the display panel 110, and a compensated data voltage Vdata_comp is applied on the basis of a sensing voltage Vsen.

On the other hand, the second compensation mode is an operating mode which is executed at a time when the driving frequency varies and in which the compensated data voltage Vdata_comp is applied according to a temperature value detected for at least a partial region of the display panel 110.

In the second compensation mode, a temperature value may be detected for the entire area of the display panel 110 and the compensated data voltage Vdata_comp may be applied according to the detected temperature value.

Alternatively, in the second compensation mode, the compensated data voltage Vdata_comp may be applied to a first area of the display panel 110 on the basis of the sensing voltage Vsen measured through the RT sensing process, and the compensated data voltage Vdata_comp may be applied to a second area other than the first area according to the temperature value.

In this case, the temperature value of the display panel 110 may be measured through the temperature sensor 150 disposed on the display panel 110 or may be predicted by analyzing the type of the image data DATA applied from the host system.

Figure 12:
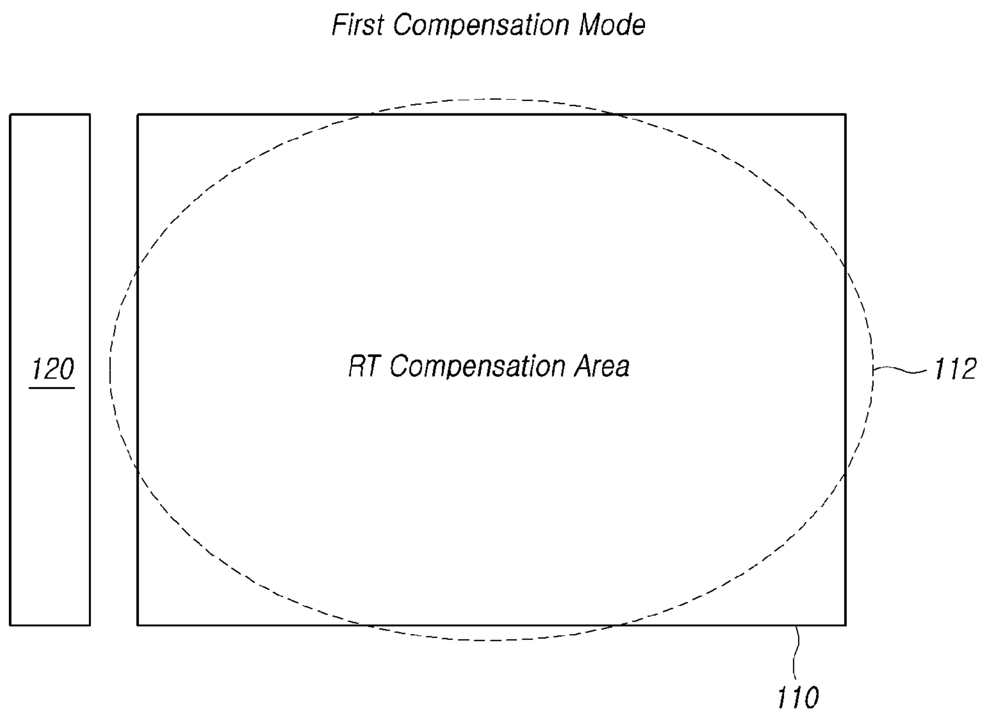
FIG. 12 is a conceptual diagram illustrating an operating state in a first compensation mode in a display device according to embodiments of the present disclosure.
Figure 13:
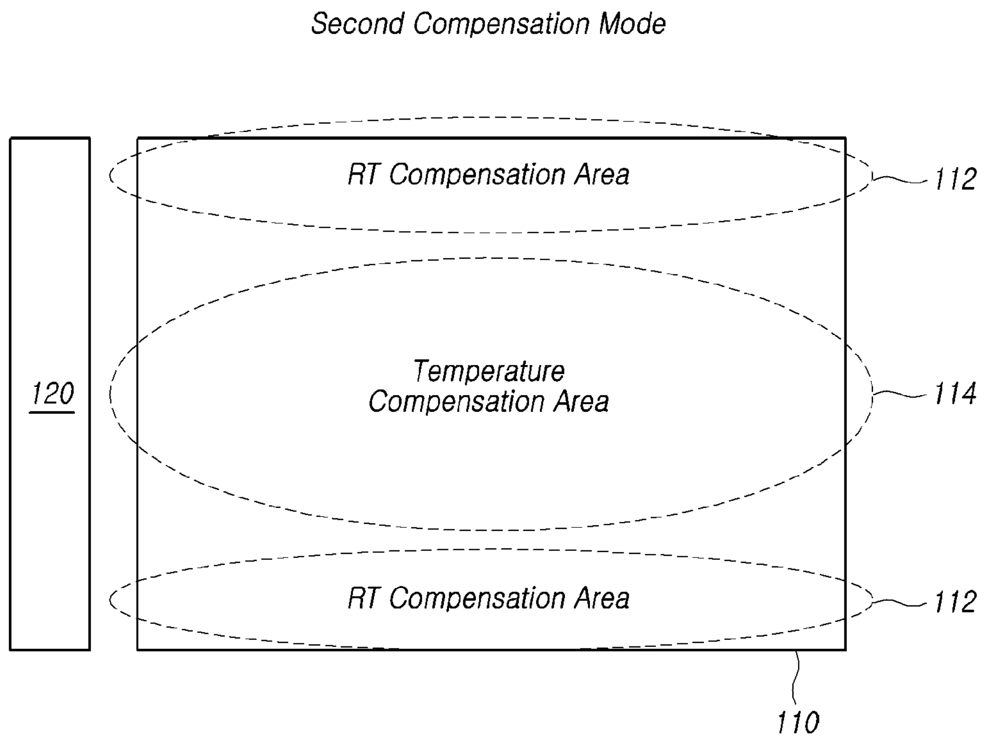
FIG. 13 is a conceptual diagram illustrating an operating state in a second compensation mode in a display device according to embodiments of the present disclosure.

FIG. 12 is a conceptual diagram illustrating an operating state in a first compensation mode in a display device according to embodiments of the present disclosure, and FIG. 13 is a conceptual diagram illustrating an operating state in a second compensation mode in a display device according to embodiments of the present disclosure.

Referring to FIG. 12 first, the display device 100 according to embodiments of the present disclosure may sequentially sense the characteristic value (a threshold voltage or mobility) of the driving transistors DRT disposed across the entire area of the display panel 110 during the blank period between the frames and compensate for a data voltage Vdata applied to a corresponding subpixel SP on the basis of the sensing voltage Vsen. In this case, the entire area of the display panel 110 may become a real-time compensation area 112 where the RT sensing process is performed.

The first compensation mode may correspond to the RT sensing process of sensing and compensating for the characteristic value of the driving transistor DRT.

In this case, in the first compensation mode, the gate lines GL may be sequentially driven, a characteristic value (threshold voltage or mobility) of a driving transistor DRT disposed in a specific subpixel SP may be sensed, and a sensing voltage Vsen may be stored in the memory MEM. In this case, the subpixel SP in which the characteristic value of the driving transistor DRT is sensed may be selected according to the order of colors. For example, the gate lines GL may be sequentially driven within one frame, and the characteristic value of the driving transistor DRT may be sensed in the order of a white subpixel W, a red subpixel R, a green subpixel G, and a blue subpixel B.

The timing controller 140 may generate compensated image data DATA_comp by reflecting a compensation gain in the sensing voltage Vsen stored in the memory MEM on basis of a gate line GL and store the compensated image data DATA_comp in the memory MEM.

Thus, the sensing voltage Vsen detected for the entire area of the display panel 110 during one frame period and the compensated image data DATA_comp generated by the timing controller 140 for the entire area may be stored in the memory MEM.

When the compensated image data DATA_comp for one frame is stored in the memory MEM, the timing controller 140 transmits the compensated image data DATA_comp to the data driving circuit 130. The data driving circuit 130 converts the compensated image data DATA_comp for one frame into the compensated data voltage Vdata_comp and applies the compensated data voltage Vdata_comp to the display panel 110.

In this case, the compensated data voltage Vdata_comp applied from the data driving circuit 130 to the display panel 110 may be supplied on basis of subpixels SP having the same color. For example, the compensated data voltage Vdata_comp may be supplied on basis of a white subpixel W, a red subpixel R, a green subpixel G, and a blue subpixel B.

The display device 100 of the present disclosure may reduce image errors appearing in the driving frequency variation process through the second compensation mode in which, when the driving frequency variation Dfreq is greater than the reference value TH1, the compensated data voltage Vdata_comp is applied to at least a partial area of the display panel 110 according to the temperature value. In one embodiment, the memory MEM stores different compensation gain that are each associated with a corresponding temperature value.

The reference value TH1 may be set in the range of a predetermined ratio based on the entire variable driving frequency in the display device 100.

For example, when the driving frequency of the display device 100 may vary between a frequency of 1 Hz and a frequency of 120 Hz, the reference value TH1 for the driving frequency variation Dfreq may be set to a value of 20% (120 Hz*0.2=24 Hz) of the entire frequency range (120 Hz) or a value that is greater than 20% of the entire frequency range (120 Hz). That is, the reference value TH1 is set to a percentage (e.g., 20%) of a maximum driving frequency from amongst the frequency range of operation of the display device 100.

In this case, when the driving frequency variation Dfreq exceeds the reference value TH1 of 24 Hz, it is determined that a sudden variation of driving frequency occurs, and thus the first compensation mode may be changed to the second compensation mode.

Referring to FIG. 13, the display device 100 according to embodiments of the present disclosure may apply the compensated data voltage Vdata_comp from memory MEM to at least a partial area of the display panel 110 according to the temperature value in the second compensation mode.

In this case, in the second compensation mode, the compensated data voltage Vdata_comp may be applied to the entire area of the display panel 110 according to the temperature value, or the compensated data voltage Vdata_comp may be applied to a partial area of the display panel 110 according to the temperature value.

When the compensated data voltage Vdata_comp is applied to the partial area of the display panel 110 according to the temperature value, the compensated data voltage Vdata_comp may be applied to the first area of the display panel 110 on the basis of the sensing voltage Vsen measured through the RT sensing process, and the compensated data voltage Vdata_comp may be applied to the second area other than the first area according to the temperature value.

In this case, the first area may be set as an area having a low brightness deviation even when the driving frequency varies in the second compensation mode. Therefore, when the driving frequency variation Dfreq is greater than the reference value TH1, compensation may be performed on only the first area through the RT sensing process for the characteristic value (the threshold voltage or mobility) of the driving transistor DRT, and the compensation may be performed on the second area on the basis of the temperature value.

Thus, in the second compensation mode, the first area may become real-time compensation areas 112, and the second area, excluding the first area, may become a temperature compensation area 114.

As in the first compensation mode, in the first area where the RT sensing process is performed in the second compensation mode, the gate lines GL may be sequentially driven, the characteristic value of the driving transistor DRT may be sensed in the order of the white subpixel W, the red subpixel R, the green subpixel G, and the blue subpixel B, and when compensated image data DATA_comp of one frame is generated, the compensated image data DATA_comp may be supplied on basis of subpixels SP having the same color.

On the other hand, without performing the RT sensing process, the compensation gain may be applied to the second area, excluding the first area, according to the temperature value determined on the basis of the temperature sensor 150 or the image data DATA.

Thus, the selected one compensation gain may be equally applied to the second area, excluding the first area, and the compensated data voltage Vdata_comp generated by the compensation gain may be supplied to the second area.

In this case, even when the driving frequency varies, the first area having a low brightness deviation may become an upper area and a lower area of the display panel 110. For example, when the display panel 110 has a 2,160×3,840 resolution, 2,160 gate lines GL may be disposed in the vertical direction, and thus compensation may be performed by the RT sensing process for the first area where 100 gate lines GL are disposed in the upper area and 100 gate lines GL are disposed in the lower area, and compensation by the temperature value may be performed for the second area.

Specifically, according to the display device 100 of the present disclosure, in the second compensation mode, the first area including the upper area where less than 5% of all the gate lines GL are included and the lower area where less than 5% thereof are included may become the RT compensation areas 112 where the RT sensing process is performed, and the second area may become the temperature compensation area 114.

In this case, the first area may vary according to a variation range of the driving frequency, and when the variation range of the driving frequency is very large, the entire area of the display panel 110 may become the temperature compensation area 114 in the second compensation mode.

In this case, the temperature of the display panel 110 may be measured through the temperature sensor 150 disposed on the display panel 110 or a heat-generating temperature of the display panel 110 may be predicted according to the type of the image data DATA applied from the host system.

For example, as a gradation displayed through the subpixel SP of the display panel 110 becomes high, the heat-generating temperature may become high. Therefore, the heat-generating temperature of the display panel 110 may be predicted by generating a histogram for each gradation from the image data DATA of each frame displayed through the display panel 110 and analyzing a frequency of the image data DATA for each gradation.

Alternatively, the heat-generating temperature of the display panel 110 may be determined according to an on-off ratio of the subpixel SP. Thus, the heat-generating temperature of the display panel 110 may be predicted by calculating an on-pixel ratio of the display panel 110 on the basis of the image data DATA transmitted from the host system.

The display driving method of the present disclosure will now be described in detail.

The operating in the first compensation mode (S100) is a process of sequentially sensing and compensating for, after power is applied to the display device 100, the characteristic value (the threshold voltage or mobility) of the driving transistor DRT for the entire area of the display panel 110 during the blank period.

The calculating of the driving frequency variation Dfreq between the current frame driving frequency Freq(N) and the previous frame driving frequency Freq(N−1) (S200) is a process of comparing the driving frequency of the display device 100 on basis of each frame and detecting the driving frequency variation Dfreq.

For example, the driving frequency of the previous frame may be detected by counting the number of pulses of the horizontal synchronization signal Hsync applied to the display panel 110 in the previous frame, and the driving frequency of the current frame may be detected by counting the number of pulses of the horizontal synchronization signal Hsync applied to the display panel 110 in the current frame. Thus, the driving frequency variation Dfreq may be detected through a difference between the number of pulses of the horizontal synchronization signal Hsync applied during the current frame and the number of pulses of the horizontal synchronization signal Hsync applied during the previous frame.

The comparing of the driving frequency variation Dfreq with the reference value TH1 (S300) is a process of determining whether the driving frequency variation Dfreq between the previous frame and the current frame exceeds the reference value TH1.

When the driving frequency variation Dfreq is greater than the reference value TH1, the operating in the second compensation mode (S400) is a process of applying the compensated data voltage Vdata_comp to at least a partial area of the display panel 110 according to the temperature value when the driving frequency variation Dfreq between the previous frame and the current frame varies to a level exceeding the reference value TH1.

In the second compensation mode, the compensated data voltage Vdata_comp may be applied to the entire area of the display panel 110 according to the temperature value, or the compensated data voltage Vdata_comp may be applied to the partial area of the display panel 110 according to the temperature value.

In this case, when the compensated data voltage Vdata_comp is applied to the partial area of the display panel 110 according to the temperature value, the compensated data voltage Vdata_comp may be applied to the first area of the display panel 110 on the basis of the sensing voltage Vsen measured through the RT sensing process, and the compensated data voltage Vdata_comp may be applied to the second area other than the first area according to the temperature value.

In the second compensation mode, the first area in which the compensation is performed through the RT sensing process is an area in which a brightness deviation due to the driving frequency variation may be relatively low and which may correspond to some of the upper area and the lower area of the display panel 110.

When the driving frequency variation Dfreq between the previous frame and the current frame varies to a level of the reference value TH1 or less, the first compensation mode may be continuously maintained.

The counting of the number of frames Count according to a frame change (S500) is a process of counting a frame change after entering the second compensation mode in order to determine a time for maintaining the second compensation mode.

That is, since the image error appearing when the driving frequency variation Dfreq between the previous frame and the current frame exceeds the reference value TH1 appears only for a certain period of time from a time of the frequency change, the display panel 110 may operate in the second compensation mode for a predetermined reference time and then return to the first compensation mode after the predetermined reference time elapses.

However, when the driving frequency variation Dfreq appears again as the reference value TH1 or more in a period within the reference time, since it is necessary to continuously maintain the second compensation mode, it is necessary to check the driving frequency variation Dfreq even during the process of counting the frame change.

The calculating of the driving frequency variation Dfreq between the current frame driving frequency Freq(N) and the previous frame driving frequency Freq(N−1) in the changed frame (S600) is a process of calculating the driving frequency variation Dfreq on basis of a frame in the second compensation mode.

The comparing of the driving frequency variation Dfreq with the reference value TH1 (S700) is a process of determining whether the driving frequency variation Dfreq exceeds the reference value TH1 on basis of a frame in the second compensation mode.

The initializing of the number of frames Count when the driving frequency variation Dfreq is found through the comparison to be greater than the reference value TH1 (S800) is a process of initializing the number of frames Count to a predetermined number (e.g., zero) to set a state to the state of the second compensation mode when the driving frequency variation Dfreq exceeds the reference value TH1 again in the second compensation mode.

When the driving frequency variation Dfreq is found through the comparison to be less than or equal to the reference value TH1, the number of frames Count may not be initialized, and the number of frames Count after entering the second compensation mode may be continuously counted.

The comparing of the counted number of frames Count with a reference frame threshold TH2 when the driving frequency variation Dfreq is less than or equal to the reference value TH1 (S900) is a process of determining the reference time for maintaining the second compensation mode on the basis of the number of frames after entering the second compensation mode. Here, a predetermined reference frame threshold TH2 is used in order to determine the reference time for maintaining the second compensation mode on basis of a frame.

In this case, the reference time for maintaining the second compensation mode may be set differently according to the driving frequency or according to the type of the image data DATA input to the display device 100.

For example, when the driving frequency of the display device 100 is high or when the image data DATA changes at high speed, such as when the input image data DATA is a moving image, the brightness deviation may increase according to the driving frequency variation and therefore the reference time for maintaining the second compensation mode may be set high.

In the case in which the reference frame threshold TH2 maintaining the second compensation mode when the driving frequency is 60 Hz is set to seven frames (TH2=7), when the driving frequency is 120 Hz, the reference frame threshold TH2 maintaining the second compensation mode may be set to ten frames (TH2=10).

The operating in the first compensation mode when the counted number of frames Count is found through the comparison to be greater than the reference frame threshold TH2 and in the second compensation mode when the counted number of frames Count is less than the reference frame threshold TH2 is a process of returning to the first compensation mode when the reference frame TH2 threshold elapses after entering the second compensation mode and maintaining the second compensation mode when the reference frame threshold TH2 does not elapse.

Figure 14:
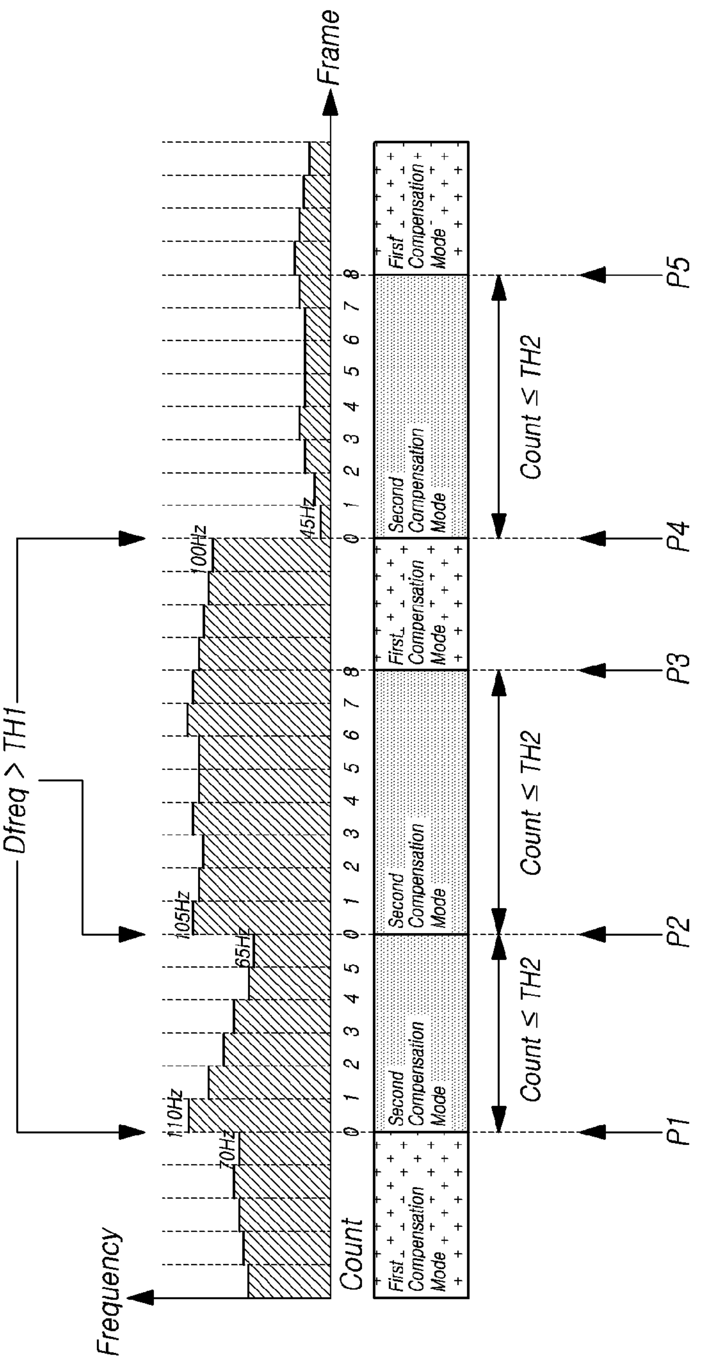
FIG. 14 is a diagram illustrating an example of a case in which a display device operates in a first compensation mode and a second compensation mode according to a change of a driving frequency according to embodiments of the present disclosure.

FIG. 14 is a diagram illustrating an example of a case in which a display device operates in a first compensation mode and a second compensation mode according to a change of a driving frequency according to embodiments of the present disclosure.

Referring to FIG. 14, the display device 100 according to embodiments of the present disclosure may operate in the first compensation mode in which the compensation is performed for the entire area of the display panel 110 through the RT sensing process after power is applied.

In the first compensation mode, the RT sensing process of sequentially sensing the characteristic value (the threshold voltage or mobility) of the driving transistor DRT during the blank period and thus compensating for the data voltage Vdata may be performed.

In this case, the driving frequency of the display device 100 may vary within the range of 1 Hz to 120 Hz, and the driving frequency may vary according to the type of the image data DATA applied from the host system. In this case, the reference value TH1 for determining the driving frequency variation Dfreq may be set to 24 Hz corresponding to 20% of the entire range of the driving frequency variation (120 Hz).

When the driving frequency variation Dfreq exceeds the reference value TH1 at a first point P1, the display device 100 may enter the second compensation mode from the first compensation mode.

In the second compensation mode, the compensated data voltage Vdata_comp may be applied to the entire area of the display panel 110 according to the temperature value, or the compensated data voltage Vdata_comp may be applied to the partial area of the display panel 110 according to the temperature value.

In this case, when the compensated data voltage Vdata_comp is applied to the partial area of the display panel 110 according to the temperature value, the compensated data voltage Vdata_comp may be applied to the first area of the display panel 110 on the basis of the sensing voltage Vsen measured through the RT sensing process, and the compensated data voltage Vdata_comp may be applied to the second area other than the first area according to the temperature value.

In this case, the display device 100 may compensate for only the first area from the first point P1 through the RT sensing process and apply the compensated data voltage Vdata_comp to the second area, excluding the first area, on the basis of the temperature value.

In addition, the display device 100 may count the frame change from the first point P1 and determine a time for maintaining the second compensation mode on basis of a frame.

When the reference frame threshold TH2 corresponding to the reference time for maintaining the second compensation mode is set to seven frames (TH2=7), the display device 100 may count the number of frames from the first point P1 and maintain the second compensation mode for the seven frames.

When the driving frequency variation Dfreq exceeds the reference value TH1 again at a second point P2 within the seven frames from the first point P1, the display device 100 may initialize the number of frames, which is counted from a time when entering the second compensation mode, to zero and maintain the second compensation mode again for the seven frames corresponding to the reference frame threshold TH2.

When the driving frequency variation Dfreq is maintained less than or equal to the reference value TH1 from the second point P2 during the seven frames, the display device 100 returns to the first compensation mode at a third point P3 where the seven frames elapse from the second point P2.

Thus, the display device 100 performs the RT sensing process of sequentially sensing and compensating for the characteristic values of the driving transistor DRT for the entire area of the display panel 110 from the third point P3.

Then, when the driving frequency variation Dfreq exceeds the reference value TH1 at a fourth point P4, the display device 100 enters the second compensation mode again and maintains the second compensation mode during the seven frames corresponding to the reference frame threshold TH2.

Therefore, the display device 100 may apply the compensated data voltage Vdata_comp to the entire area of the display panel 110 according to the temperature value from the fourth point P4 or apply the compensated data voltage Vdata_comp to the partial area of the display panel 110 according to the temperature value.

When the compensated data voltage Vdata_comp is applied to the partial area of the display panel 110 according to the temperature value, the compensation may be performed only for the upper area and the lower area of the display panel 110 corresponding to the first region through the RT sensing process, and the compensation may be performed for the second area according to the temperature value determined according to the temperature sensor 150 or the type of the image data DATA.

When the driving frequency variation Dfreq is maintained on basis of a frame after the reference value TH1 during the seven frames from the fourth point P4, the display device 100 operates again in the first compensation mode from a fifth point P5 where the seven frames elapse from the fourth point P4.

Through the above processes, the display device 100 of the present disclosure performs the compensation for only the first area in which a brightness deviation is relatively small through the RT sensing process for a certain time from the time when the driving frequency variation Dfreq exceeds the reference value TH1 and performs the compensation for the second area according to the temperature value determined from the temperature sensor 150 or the image data DATA so that an image defect recognized by a user due to a variation in driving frequency can be reduced.

The following is a brief description of the above-described embodiments of the present disclosure.

The display device 100 of the present disclosure includes the display panel 110 in which the plurality of subpixels SP including the plurality of gate lines GL, the plurality of data lines DL, and the driving transistor DRT are disposed, the data driving circuit 130 configured to convert the image data DATA into the data voltage Vdata and apply the data voltage Vdata to the plurality of data lines DL, and the timing controller 140 configured to control the data driving circuit 130 and switch the first compensation mode for the characteristic value of the driving transistor DRT to the second compensation mode when the driving frequency variation Dfreq exceeds the reference value TH1. In the first compensation mode, the characteristic value of the driving transistor DRT may be compensated for the entire area of the display panel 110 through the RT sensing process in the blank period, and in the second compensation mode, the characteristic value of the driving transistor DRT may be compensated for at least the partial area of the display panel 110 according to the temperature value.

The frequency variation Dfreq may be determined from a difference between the number of pulses of the horizontal synchronization signal Hsync in the current frame and the number of pulses of the horizontal synchronization signal Hsync in the previous frame.

The reference value TH1 may be set to a value greater than or equal to 20% of the entire range in which the driving frequency is variable.

In the second compensation mode, the characteristic value of the driving transistor DRT may be compensated for the entire area of the display panel 110 according to the temperature value.

In the second compensation mode, the characteristic value of the driving transistor DRT may be compensated for the first area of the display panel 110 through the RT sensing process during the blank period and may be compensated for the second area, excluding the first area, according to the temperature value.

The first area may be selected as an area with a brightness deviation smaller than a predetermined value of a brightness deviation due to the driving frequency variation in the display panel 110.

The first area may include the upper area where less than 5% of the plurality of gate lines GL disposed in the display panel 110 are disposed and the lower area where less than 5% of the gate lines GL are disposed.

The characteristic value of the driving transistor DRT may be mobility, and the RT sensing process may be a process of sensing the mobility of the driving transistor DRT.

The timing controller 140 may return to the first compensation mode at a time when the reference time TH2 elapses from the time when switched to the second compensation mode.

The reference time TH2 may be set on basis of a frame and may be determined according to a speed of change of the image data DATA.

When the driving frequency variation exceeds the reference value TH1 within the reference time TH2, the timing controller 140 may initialize the time when the operating mode is switched to the second compensation mode.

During the blank period, the timing controller 140 may apply the recovery voltage REC for resetting the subpixel SP after the RT sensing process.

The display device 100 may further include the temperature sensor 150 configured to detect a temperature of the display panel 110, and a temperature value may be a value measured by the temperature sensor 150.

The temperature value may be a value determined using a histogram for each gradation of the image data DATA.

The temperature value may be a value determined using an on-pixel ratio of the display panel 110 on the basis of the image data DATA.

The display driving method according to the present disclosure, which includes the display panel 110 in which the plurality of subpixels SP including the plurality of gate lines GL, the plurality of data lines DL, and the driving transistor DRT are disposed, and the data driving circuit 130 configured to convert the image data DATA into the data voltage Vdata and apply the data voltage Vdata to the plurality of data lines DL, includes operating in the first compensation mode in which the characteristic value of the driving transistor DRT is compensated for the entire area of the display panel 110 through the RT sensing process during the blank period, calculating a driving frequency variation Dfreq between a driving frequency of a current frame and a driving frequency of a previous frame, comparing the driving frequency variation Dfreq with the reference value TH1, and when the driving frequency variation Dfreq is greater than the reference value TH1, operating in the second compensation mode, wherein, in the second compensation mode, the characteristic value of the driving transistor DRT may be compensated for at least a partial area of the display panel 110 according to the temperature value.

The operating in the second compensation mode may include counting the number of frames Count according to a frame change, comparing the counted number of frames Count with the reference frame threshold TH2, and operating in the first compensation mode when the counted number of frames Count is greater than the reference frame threshold TH2.

The display driving method may further include, responsive to the driving frequency variation Dfreq being greater than the reference value TH1, initializing the counted number of frames to a predetermined value (e.g., zero) while the counted number of frames is less than the reference frame threshold TH2.

In the second compensation mode, the characteristic value of the driving transistor DRT may be compensated for the first area of the display panel 110 through the RT sensing process during the blank period and may be compensated for the second area, excluding the first area, according to the temperature value.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure.

What is claimed is:

1. A display device comprising:

a display panel including a plurality of subpixels, a plurality of gate lines, a plurality of data lines, and a plurality of driving transistors each included in a corresponding subpixel from the plurality of subpixels;

a data driving circuit configured to convert image data into data voltages and apply the data voltages to the plurality of data lines; and a timing controller configured to control the data driving circuit and switch between a first compensation mode and a second compensation mode responsive to a driving frequency variation of the display device during which the display device switches between different driving frequencies exceeding a reference value, wherein, in the first compensation mode, the data voltages of the plurality of driving transistors in an entire area of the display panel are compensated through a real-time sensing process of characteristic values of the plurality of driving transistors during a blank period of a frame period, the frame period including a display driving period during which the data voltages are applied and the blank period during which the data voltages are maintained, and in the second compensation mode, the data voltages of the plurality of driving transistors in at least a partial area of the display panel are compensated for according to a temperature value of the display panel.

2. The display device of claim 1, wherein the driving frequency variation is determined based on a difference between a number of pulses of a horizontal synchronization signal in a current frame and a number of pulses of the horizontal synchronization signal in a previous frame.

3. The display device of claim 1, wherein the reference value is a value greater than or equal to 20% of a maximum driving frequency from amongst a frequency range of operation of the display device.

4. The display device of claim 1, wherein, in the second compensation mode, the data voltages applied to the plurality of driving transistors in the entire area of the display panel are compensated for according to the temperature value.

5. The display device of claim 1, wherein in the second compensation mode, data voltages of first driving transistors from the plurality of driving transistors in a first area of the display panel are compensated through the real-time sensing process of the characteristic values of the first driving transistors during the blank period, and data voltages of second driving transistors from the plurality of driving transistors in a second area of the display panel that excludes the first area are compensated according to the temperature value of the display panel.

6. The display device of claim 5, wherein the first area includes an area with a brightness deviation smaller than a predetermined value of a brightness deviation due to the driving frequency variation in the display panel.

7. The display device of claim 6, wherein the first area includes an upper area of the display panel where less than 5% of the plurality of gate lines are disposed in the display panel are disposed and a lower area of the display panel where less than 5% of the plurality of gate lines are disposed in the display panel.

8. The display device of claim 1, wherein the characteristic value of at least one driving transistor of the plurality of driving transistors is a mobility of the driving transistor and the mobility of the driving transistor is sensed during the real-time sensing process of the first compensation mode.

9. The display device of claim 1, wherein the timing controller switches to the first compensation mode from the second compensation mode responsive to elapsing of a reference time from when the second compensation mode began.

10. The display device of claim 9, wherein the reference time for the frame period is determined according to a speed of the image data.

11. The display device of claim 9, wherein, the timing controller initializes switching from the first compensation mode to the second compensation mode responsive to the driving frequency variation exceeding the reference value within the reference time.

12. The display device of claim 1, wherein the timing controller applies a recovery voltage that resets a subpixel from the plurality of subpixels after the real-time sensing process during the blank period.

13. The display device of claim 1, further comprising:

a temperature sensor configured to measure the temperature value that is indicative of the temperature of the display panel.

14. The display device of claim 1, wherein the temperature value is determined based on a histogram for each gradation of the image data.

15. The display device of claim 1, wherein the temperature value is based an on-pixel ratio of the display panel due to the image data.

16. A display driving method of a display device including a display panel including a plurality of subpixels, a plurality of gate lines, a plurality of data lines, and a plurality of driving transistor transistors each included in a corresponding subpixel from the plurality of subpixels, and a data driving circuit configured to convert image data into data voltages and apply the data voltages to the plurality of data lines, the method comprising:

operating in a first compensation mode during which the data voltages applied to the plurality of driving transistors in an entire area of the display panel are compensated for through a real-time sensing process of characteristic values of the plurality of driving transistors during a blank period of a frame period, the frame period including a display driving period during which the data voltages are applied and the blank period during which the data voltages are maintained;

calculating a driving frequency variation between a driving frequency of a current frame and a driving frequency of a previous frame that is prior to the current frame;

comparing the frequency variation with a reference value; and switching from operating in the first compensation mode to operating in a second compensation mode responsive to the frequency variation being greater than the reference value, wherein, during the second compensation mode, the data voltages applied to the plurality of driving transistors in at least a partial area of the display panel are compensated according to a temperature value of the display panel.

17. The display driving method of claim 16, wherein operating in the second compensation mode comprises:

counting a number of frames since a start of the second compensation mode;

comparing the counted number of frames with a reference frame threshold; and switching operation from the second compensation mode to operating in the first compensation mode responsive to the counted number of frames being greater than the reference frame threshold.

18. The display driving method of claim 17, further comprising:

initializing the counted number of frames to a predetermined value responsive to the driving frequency variation being greater than the reference value and the counted number of frames being less than the reference frame threshold.

19. The display driving method of claim 16, wherein, during the second compensation mode, data voltages applied to first driving transistors from the plurality of driving transistors in a first area of the display panel are compensated through the real-time sensing process of characteristic values of the first driving transistors during the blank period, and data voltages applied to second driving transistors in a second area of the display panel that excludes the first area are compensated according to the temperature value of the display panel.

20. A display device comprising:

a display panel including a plurality of subpixels, a plurality of gate lines, a plurality of data lines, and a plurality of driving transistors each included in a corresponding subpixel from the plurality of subpixels;

a data driving circuit configured to convert image data into data voltages and apply the data voltages to the plurality of data lines during a display driving period of a frame period that includes the display driving period and a blank period during which the data voltages are maintained;

a timing controller configured to control the data driving circuit and switch operation of the display device from a first compensation mode to a second compensation mode based on the display device switching between a first driving frequency and a second driving frequency; and a sensor on a portion of the display panel, the sensor configured to measure a characteristic of the display panel, wherein during the first compensation mode the data voltages applied to the plurality of driving transistors in an entire area of the display panel are compensated based on sensed characteristics of the plurality of driving transistors during the blank period of the frame period, and during the second compensation mode the data voltages applied to the plurality of driving transistors in at least a portion of the display panel are compensated based on the characteristic of the display panel measured by the sensor.

21. The display device of claim 20, wherein a sensed characteristic of at least one driving transistor of the plurality of driving transistors during the first compensation mode comprises at least one of a threshold voltage of the at least one driving transistor or a mobility of the at least one driving transistor, and the characteristic of the display panel measured by the display panel comprises a temperature of the display panel.

22. The display device of claim 20, wherein the timing control is further configured to determine a driving frequency variation based on a difference between a number of pulses of a horizontal synchronization signal while the display device operates at the second driving frequency in a current frame and a number of pulses of the horizontal synchronization signal while the display device operates at the first driving frequency in a previous frame, and switch from the first compensation mode to the second compensation mode responsive to the driving frequency exceeding a reference value threshold.

23. The display device of claim 22, wherein the timing controller is further configured to switch from the second compensation mode back to the first compensation mode responsive to a number of frame periods that occurred since a start of the second compensation period exceeding a reference frame threshold.

24. The display device of claim 23, wherein the timing controller is further configured to reset the number of frame periods that occurred since the start of the second compensation period to a predetermined value responsive to the driving frequency variation being greater than the reference value threshold and the number of frame periods being less than the reference frame threshold.

25. The display device of claim 20, wherein during the second compensation mode, the data voltages applied to first driving transistors from the plurality of driving transistors in a first area of the display panel are compensated through real-time sensing of the sensed characteristics of the first driving transistors during the blank period, and the data voltages applied to second driving transistors from the plurality of driving transistors in a second area of the display panel that is larger than the first area are compensated according to the measured characteristic of the display panel.

* * * * *